(12) United States Patent  (10) Patent No.: US 7,116,417 B2
Imura  (45) Date of Patent: Oct. 3, 2006

(54) SPECTROMETER AND METHOD FOR CORRECTING WAVELENGTH DISPLACEMENT OF SPECTROMETER

(75) Inventor: Kenji Imura, Toyohashi (JP)

(73) Assignee: Konica Minolta Sensing, Inc., Osaka (JP)

( * ) Notice: Subject to any disclaimer, the term of this patent is extended or adjusted under 35 U.S.C. 154(b) by 410 days.

(21) Appl. No.: 10/752,595

(22) Filed: Jan. 8, 2004

(65) Prior Publication Data
US 2005/0041248 A1    Feb. 24, 2005

(30) Foreign Application Priority Data
Aug. 21, 2003    (JP)    ............................. 2003-297921

(51) Int. Cl.
G01J 3/28    (2006.01)
G01J 3/30    (2006.01)
(52) U.S. Cl. ...................... 356/326; 356/318; 356/319; 356/331
(58) Field of Classification Search ................ 356/318, 356/319, 326–334
See application file for complete search history.

(56) References Cited

U.S. PATENT DOCUMENTS 4,798,464 A * 1/1989 Boostrom .................... 356/328

| | | | | |
|---|---|---|---|---|
| 5,212,537 A | * | 5/1993 | Birang et al. | 356/300 |
| 5,268,737 A | * | 12/1993 | Fukuma et al. | 356/328 |
| 5,777,733 A | * | 7/1998 | Radziuk | 356/328 |
| 6,876,448 B1 | * | 4/2005 | Imura et al. | 356/326 |

FOREIGN PATENT DOCUMENTS

JP    2001-208607 A    8/2001
JP    2002-323309 A    11/2002

* cited by examiner

*Primary Examiner*—Layla G. Lauchman
(74) *Attorney, Agent, or Firm*—McDermott Will & Emery LLP

(57) ABSTRACT

A spectrometer for correcting a displacement of a dispersed light image having a light source for outputting a monochromatic ray of light, an optical system which images a dispersed light image of the monochromatic ray through an incident slit on an imaging plane, a sensor array, and a calculator for calculating a variation in an imaging position of a primary dispersed light image of the monochromatic ray through the incident slit on the imaging plane from its initial position as a first image displacement amount, and a variation in an imaging position of a secondary dispersed light image of the monochromatic ray through the incident slit from its initial position as a second image displacement amount, and calculating, based on the first and second image displacement amounts, a third image displacement amount which is free of an influence due to a fluctuation of a wavelength of the monochromatic ray.

20 Claims, 9 Drawing Sheets

SPECTROMETER AND METHOD FOR CORRECTING WAVELENGTH DISPLACEMENT OF SPECTROMETER

This application is based on Japanese patent application No. 2003-297921 filed on Aug. 21, 2003, the contents of which are hereby incorporated by references.

BACKGROUND OF THE INVENTION

1. Field of the Invention

The present invention relates to a spectrometer for measuring a spectral intensity distribution of light and having a function of correcting a displacement of a dispersed light image or a wavelength displacement accompanied by such an image displacement, and to a method for correcting such a displacement with use of the spectrometer.

2. Description of the Related Art

Conventionally, it is often the case that a polychrometer which is capable of measuring all the measurable wavelengths at the same time without providing a movable member and having high usability of a flux of light is used as spectrometer means in a spectrometer for measuring a spectral intensity distribution of light. Such a polychrometer includes a slit member through which light for measurement is passed, a diffraction grating for dispersing the incident light according to wavelengths, an optical imaging system for imaging the dispersed light image, and a sensor array disposed at an imaging position of the dispersed light image for detecting the spectral intensity of the dispersed light image. These elements are supported on a support structure. A positional displacement of the respective optical elements to the support structure with time and thermal change is unavoidable. In the case where spectrometer means of a light dispersive type such as a polychrometer is used, precision with respect to the wavelengths is susceptible to a positional displacement of the respective optical elements to the support structure. Accordingly, it is required to check up the wavelength precision and to correct a wavelength displacement in order to secure high measuring precision of the spectrometer.

It is necessary to provide a stable wavelength reference member for checkup of the wavelength precision and correction of a wavelength displacement of a spectrometer. As such a stable wavelength reference member, gas laser beam, light emitted from a bright light source such as mercury (Hg), cadmium (Cd), and helium (He), and light transmitted through or reflected from a reference sample of light transmission or reflection type are used (see Japanese Unexamined Patent Publication No. 2001-208607).

Use of gas laser beam or light emitted from a bright light source is expensive. In the case of using transmitted or reflected light from a reference sample, it is necessary to keep the ambient temperature constant to secure measuring precision of the spectrometer. In both of the cases of using gas laser beam and light from a bright light source, it is difficult to handle the spectrometer on the user side, not to mention incorporating such a reference member into a spectrometer. Therefore, the user has to temporarily return the spectrometer to the manufacturing factory or the like facility for checkup of the wavelength precision and correction of a wavelength displacement, which takes time and cost both on the side of the user and the manufacturer. In the above arrangement, it is difficult to perform the checkup and correction by a sufficient and satisfactory number of times. Further, if a spare spectrometer is necessary to be substituted for the spectrometer for checkup during the period of checkup and correction, an additional cost for rental of such a spare spectrometer may be required.

SUMMARY OF THE INVENTION

It is an object of the present invention to provide a spectrometer and an image displacement correcting method which are free from the problems residing in the prior art.

According to an aspect of the present invention, a monochromatic ray is outputted from a light source, and is passed through at least one incident slit. A dispersed light image of the monochromatic ray through the incident slit is imaged on an imaging plane. A sensor array including a number of photoelectric conversion elements receive the dispersed light image according to wavelengths. The photoelectric conversion elements are arrayed on the imaging plane of the sensor array to output an electric signal in correspondence to an intensity of the received light with respect to each wavelength component.

A variation in an imaging position of a primary dispersed light image of the monochromatic ray through the incident slit on the sensor array from an initial position is calculated as a first image displacement amount when the monochromatic ray from the light source is passed through the incident slit. A variation in an imaging position of a secondary dispersed light image of the monochromatic ray through the incident slit on the sensor array from an initial position thereof is calculated as a second image displacement amount when the monochromatic ray from the light source is passed through the incident slit.

A third image displacement amount which is free of an influence due to a wavelength fluctuation of the monochromatic ray is calculated based on the first image displacement amount and the second image displacement amount.

This enables to secure a wavelength precision substantially equal to the wavelength precision at an initial calibration time of wavelengths by correcting a wavelength displacement even if a wavelength displacement occurs due to a displacement of respective optical elements of the spectrometer to a support structure with time and thermal change.

These and other objects, features and advantages of the present invention will become more apparent upon a reading of the following detailed description and accompanying drawing.

DESCRIPTION OF THE PREFERRED EMBODIMENTS OF THE INVENTION

Figure 1:
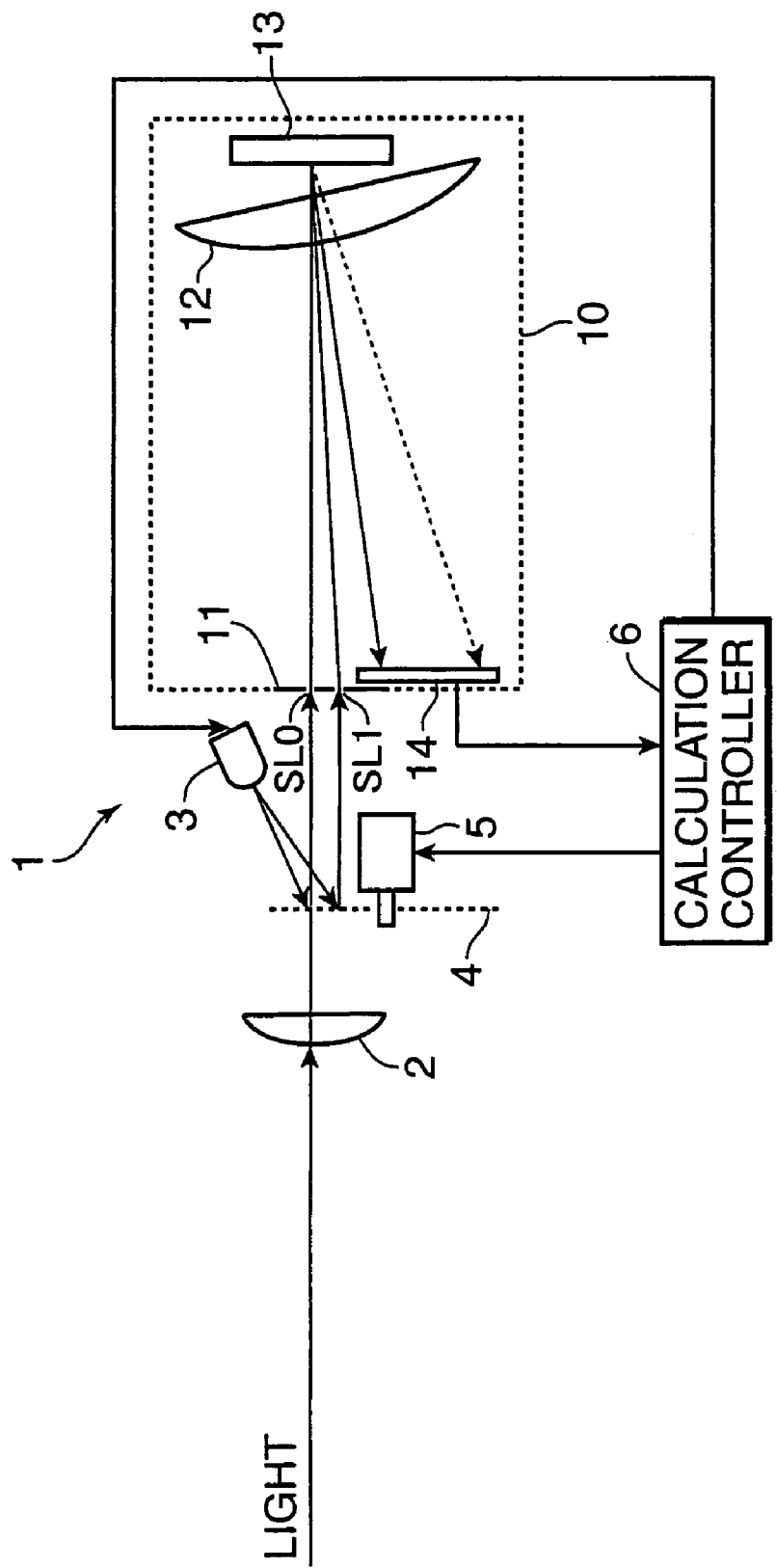
FIG. 1 is an illustration showing an arrangement of a luminance meter, as an example of a spectrometer according to an embodiment of the present invention, capable of correcting a displacement of a dispersed light image or a wavelength displacement accompanied by a displacement of a dispersed light image.

In the following, preferred embodiments of the present invention is described with reference to the accompanying drawings. It should be noted that elements identical to each other in the drawings are denoted at the same reference numerals, and a repetitive description on the same elements will be omitted herein.

Referring to FIG. 1 showing an arrangement of a luminance meter, the luminance meter is capable of correcting a displacement of a dispersed light image or a wavelength displacement accompanied by a displacement of a dispersed light image. The luminance meter 1 shown in FIG. 1 includes a light receiving lens 2, a light source 3, a shutter 4, a shutter driving motor 5, a calculation controller 6, and a polychrometer 10.

The light receiving lens 2 is adapted to direct light for measurement to the polychrometer 10. The light for measurement includes light reflected from a sample, light transmitted through a sample, and illumination light from a light source.

The light source 3 is comprised of a light emitting diode (LED), for instance, and is adapted to emit a monochromatic ray having a wavelength fluctuation. The shutter (also, called as "chopper") 4 is controllably opened and closed, and has a diffusive/reflective surface on the backside surface thereof. When the shutter 4 is opened, light for measurement which has passed through the lens 2 is incident into the polychrometer 10, whereas when the shutter 4 is closed, a monochromatic ray from the light source 3 is reflected on the diffusive/reflective surface of the shutter 4, and incident into the polychrometer 10. The shutter driving motor 5 is adapted to control open and close of the shutter 4 based on a control signal from the calculation controller 6.

The polychrometer 10 includes a slit member 11, a collimator lens 12, a diffraction grating 13, and a sensor array 14.

The slit member 11 is formed with a first slit SL0 and a second slit SL1. The collimator lens 12 is adapted to collimate light for measurement or a monochromatic ray that has passed through the first slit SL0, and a monochromatic ray that has passed through the second slit SL1 into parallel rays, and to image a dispersed light image onto a light sensing plane (imaging plane) of the sensor array 14 after dispersing the parallel rays through an incident slit unit (first slit SL0 and second slit SL1) by the diffraction grating 13.

The diffraction grating 13 is adapted to reflect and disperse a monochromatic ray according to wavelengths in such a manner that a primary dispersed light image of a monochromatic ray passing through the first slit SL0 and a secondary dispersed light image of the monochromatic ray passing through the second silt SL1 are imaged on the imaging plane of the sensor array 14, respectively.

The sensor array 14 is constituted of a number of photoelectric conversion elements (hereinafter, also called as "sensors") arrayed at a certain interval corresponding to, e.g., 10 nm in terms of a wavelength of dispersed light. Electrical signals corresponding to the received light intensities outputted from the respective sensors are processed by the calculation controller 6.

The calculation controller 6 is comprised of, e.g., a central processing unit (CPU), and an electrically erasable and programmable read only memory (EEPROM). The calculation controller 6 controllably turns on the light source 3 so as to allow a monochromatic ray from the light source 3 to impinge on the diffraction grating 13 through the first slit SL0 and the second slit SL1, respectively, sets a positional displacement of an imaging position of a primary dispersed light image of the monochromatic ray through the first slit SL0 on the imaging plane of the sensor array 14 from an initial position thereof, as a first image displacement amount, sets a positional displacement of an imaging position of a secondary dispersed light image of the monochromatic ray through the second slit SL1 on the imaging plane of the sensor array 14 from an the initial imaging position thereof, as a second image displacement amount; and calculates an image displacement amount free of an influence due to a wavelength fluctuation of the monochromatic ray based on the first image displacement amount and the second image displacement amount. The calculation controller 6 performs various computations for correcting a wavelength displacement, controls turning on/off of the light source 3, and controls driving of the shutter driving motor 5.

In measurement, the calculation controller 6 controls the shutter driving motor 5 to open the shutter 4 so as to allow light through the lens 2 to pass through the first slit SL10. The calculation controller 6 A/D converts outputs of the respective sensors of the sensor array 14, on which a dispersed light image of the incident light is imaged, so as to measure the spectral intensity of the light. Immediately after the A/D conversion, the calculation controller 6 drives the shutter driving motor 5 to close the shutter 4, thereby blocking the light for measurement from coming into the polychrometer 10. When the light for measurement is blocked, an offset signal is measured. Thus, the calculation controller 6 calculates a spectral intensity of the light for measurement free of an offset signal component by subtracting the offset signal from the actually measured spectral intensity.

In correcting a wavelength displacement, the calculation controller 6 drives the shutter driving motor 5 to close the shutter 4, thereby blocking the light for measurement, while turning on the light source 3 to emit a monochromatic ray. The monochromatic ray from the light source 3 is passed through the first slit SL0 and the second slit SL1, respectively, after being dispersed and reflected on the diffusive/reflective surface of the shutter 4. The calculation controller 6 A/D converts outputs of the respective sensors of the sensor array 14, on which the primary and secondary dispersed light images of the monochromatic ray are imaged, so as to measure respective spectral intensity profiles of the primary and secondary dispersed light images. Immediately after the measurement, the calculation controller 6 controls the light source 3 to turn off the light to measure an offset signal. The calculation controller 6 calculates spectral intensity profiles of the monochromatic ray free of an offset signal component by subtracting the offset signal from the actually measured spectral intensity profiles, and estimates a wavelength displacement amount according to the following method.

Now, estimation of a wavelength displacement amount is described with reference to FIG. 2. Since a wavelength of a monochromatic ray from a light source such as an LED or a laser diode (LD) fluctuates, an image displacement amount detected based on the monochromatic ray includes an image displacement component resulting from a wavelength displacement of the monochromatic ray and an image displacement component resulting from a mechanical change of the polychrometer. In order to separate these two displacement components from each other, this embodiment uses a difference in spectral sensitivity of the sensor array with respect to two factors, namely, a primary dispersed light image and a secondary dispersed light image dispersed and reflected on the diffraction grating. In other words, whereas in a mechanical change of the polychrometer, a substantially identical image displacement occurs between the primary dispersed light image and the secondary dispersed light image, in a wavelength displacement of the monochromatic ray, an image displacement of the secondary dispersed light image is twice as large as that of the primary dispersed light image because the secondary dispersed light image has a wavelength dispersion twice as large as the primary dispersed light image.

Figure 2:
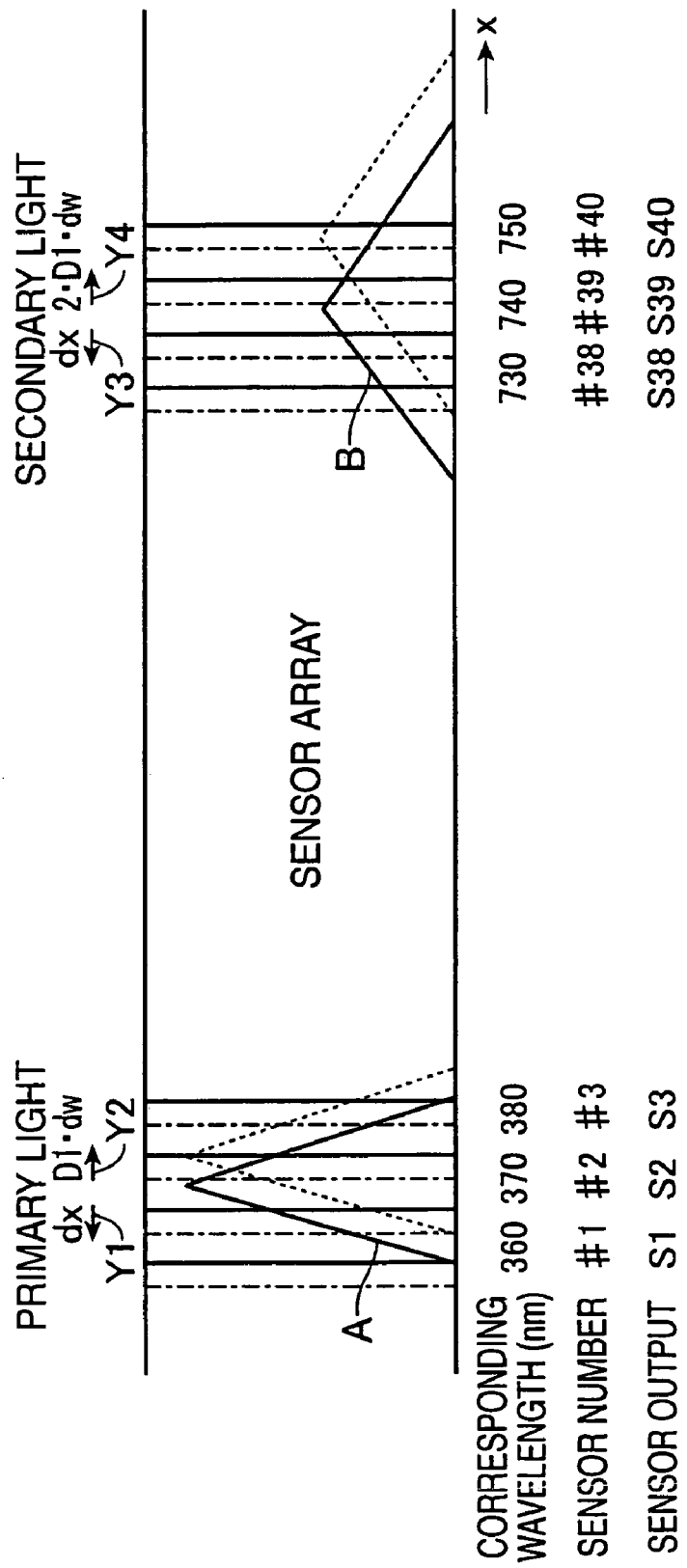
FIG. 2 is an illustration for explaining an estimation of a wavelength displacement.

FIG. 2 shows distributions of a primary dispersed light image A and a secondary dispersed light image B which are respectively imaged at different positions on the imaging plane of the sensor array 14 when a monochromatic ray having a central wavelength of 370 nm is incident. An incident ray having a central wavelength of 370 nm is dispersed and imaged on the sensor #2 of the sensor array 14 corresponding to a wavelength of 370 nm. In FIG. 2, spectral intensity distributions of the primary and secondary dispersed light images A and B are each approximated to a triangle defined at an interval of a half bandwidth of 15 nm. The secondary dispersed light image B is imaged on the sensor #39 of the sensor array 14 corresponding to a wavelength of 740 nm, twice as large as 370 nm. Since the secondary dispersed light image B has a half bandwidth twice as large as the primary dispersed light image A, and has a lower diffraction efficiency, the light amount of the secondary dispersed light image B is lowered.

Whereas a shifting toward a shorter wavelength (in the directions shown by the arrows Y1, Y3 in FIG. 3) of the sensor array 14, namely, an image displacement resulting from a mechanical change of the polychrometer is dx with respect to the primary dispersed light image A and the secondary dispersed light image B, a shifting toward a longer wavelength (in the directions shown by the arrows Y2, Y4 in FIG. 2) of the sensor array 14, namely, an image displacement resulting from a wavelength displacement dw of a monochromatic ray is D1×dw with respect to the primary dispersed light image A, and D2×dw with respect to the secondary dispersed light image B, assuming that wavelength dispersions of the primary dispersed light image A and the secondary dispersed light image B are $D1=(dn/dw)_1$ and $D2=(dn/dw)_2$, respectively, wherein $$D2 = 2 \cdot D1 \tag{1}$$

Since actually detected first and second image displacement amounts d1 and d2 of the primary and secondary dispersed light images A and B include the aforementioned two displacement components resulting from a wavelength displacement of a monochromatic ray and resulting from a mechanical change of the polychrometer, d1 and d2 are expressed by the following equations (2), (3), respectively.

$$d1 = D1 \times dw + dx \tag{2}$$

$$d2 = D2 \times dw + dx \tag{3}$$

dx can be expressed by the following equation (4) based on the equations (1) through (3).

$$dx = 2 \times d1 - d2 \tag{4}$$

In this way, the image displacement dx of the polychrometer free of an influence due to the wavelength displacement dw of the monochromatic ray is obtained. The first and second image displacement amounts d1 and d2 are estimated based on a relative ratio of outputs of the respective sensors of the sensor array 14 in a region where the primary dispersed light image is imaged and in a region where the secondary dispersed light image is imaged.

Figure 3:
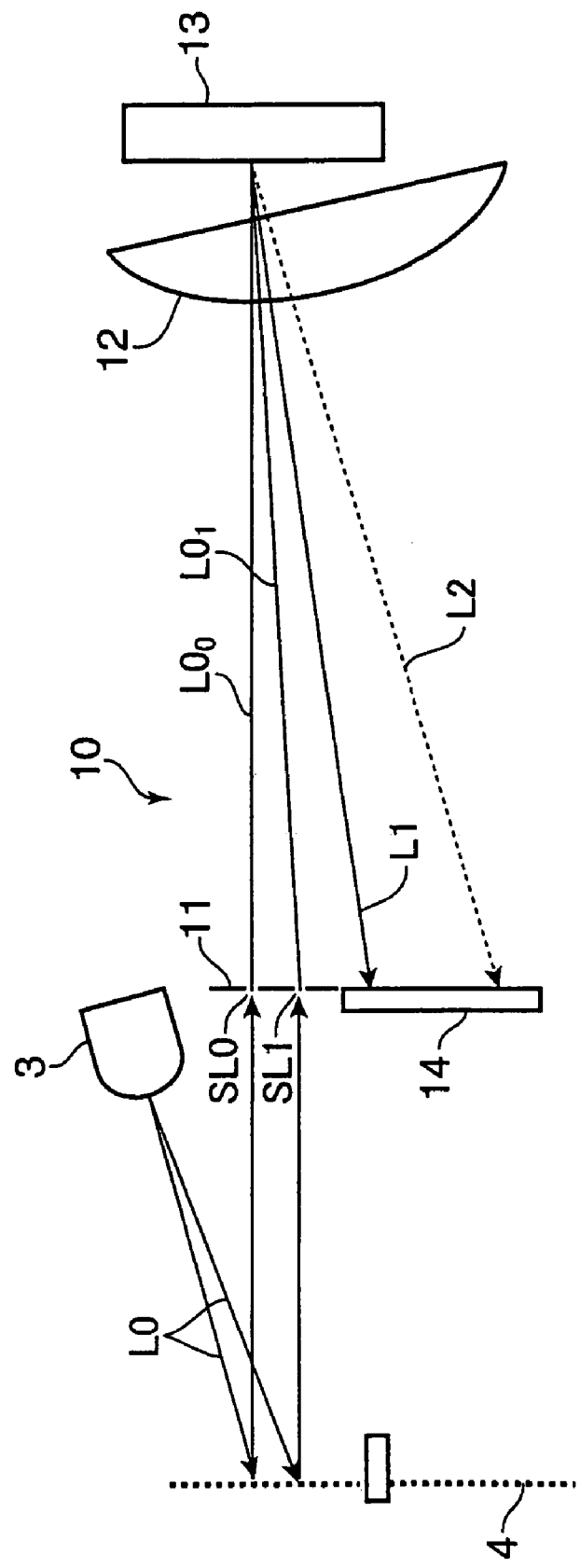
FIG. 3 is an illustration showing an arrangement of a polychrometer in the embodiment of the present invention.

FIG. 3 shows an arrangement of the polychrometer in the embodiment. A monochromatic ray L0 from the light source 3 is reflected on the diffusive/reflective surface of the shutter 4, and passed through the first slit SL0 and the second slit SL1 formed in the slit member 11, respectively, as monochromatic rays $LO_0$ and $LO_1$. The monochromatic rays $LO_0$ and $LO_1$ passing through the first slit SL0 and the second slit SL1 are collimated by the collimator lens 12, and impinge on the diffraction grating 13 as parallel rays. After impinging on the diffraction grating 13, the monochromatic ray $LO_0$ is dispersed on the diffraction grating 13 as a primary ray L1. The primary ray L1 is then incident onto the sensor array 14 after passing through the collimator lens 12. Thus, a primary diffused light image that has passed through the first slit SL0 and dispersed on the diffraction grating 13 is imaged on the imaging plane of the sensor array 14. On the other hand, after passing through the second slit SL1 and impinging on the diffraction grating 13 via the collimator lens 12, the monochromatic ray $LO_1$ is dispersed on the diffraction grating 13 as a secondary ray L2. After passing through the collimator lens 12 again, the secondary ray L2 is incident onto the sensor array 14. Thus, a secondary dispersed light image that has passed through the second slit SL1 and dispersed on the diffraction grating 13 is imaged on the imaging plane of the sensor array 14.

In this embodiment, the primary dispersed light image of a monochromatic ray that has passed through the first slit SL0 is imaged on the sensor array 14, and the secondary dispersed light image of the monochromatic ray that has passed through the second slit SL1 is imaged on the sensor array 14.

Alternatively, a secondary dispersed light image of a monochromatic ray that has passed through the first slit SL0 may be imaged on the sensor array 14, and a primary dispersed light image of the monochromatic ray that has passed through the second slit SL1 may be imaged on the sensor array 14.

As mentioned above, in this embodiment, the slit member 11 is formed with the first slit SL0 for passing light for measurement, and the second slit SL1 for correcting a wavelength displacement. Further, a monochromatic ray from the light source 3 is passed through the first slit SL0 and the second slit SL1, respectively, and an image displacement amount free of an influence due to a wavelength displacement of the monochromatic ray is obtained based on the primary dispersed light image that has passed through the first slit SL0 and the secondary dispersed light image that has passed through the second slit SL1, or based on the secondary dispersed light image that has passed through the first slit SL0 and the primary dispersed light image that has passed through the second slit SL1.

The above arrangement is advantageous in eliminating a requirement as required in a first modification referring to FIG. 4, which will be described later, in which a primary dispersed light image and a secondary dispersed light image both of which have passed through a single slit are imaged on the sensor array 14, in selecting a wavelength in the light source for emitting a monochromatic ray. With such an arrangement, a light source capable of emitting a monochromatic ray in a longer wavelength can be used, which is advantageous in providing an improved spectral sensitivity, and light emission efficiency, and reducing the production cost.

In this embodiment, the first slit SL0 for passing light for measurement, and the second slit SL1 for passing light for correcting a wavelength displacement are formed at the respective positions in the common slit member 11. In such an arrangement, a particular measure is not required to correct a relative displacement of the first slit SL0 and the second slit SL1, and the dispersed light images imaged through the first slit SL0 and the second slit SL1 show image displacements substantially identical to each other resulting from a positional displacement of the respective optical elements of the spectrometer (luminance meter) to the support structure. This arrangement is advantageous in calculating a wavelength displacement amount with a sufficiently small measurement error based on the image displacements substantially identical to each other.

Further, the shutter 4 is arranged in front of the first slit SL0 and the second slit SL1 (on the side where light for measurement and a monochromatic ray from the light source 3 are incident). The light source 3 is turned on to emit light in a state that the shutter 4 is closed to thereby block light for measurement from passing through the first slit SL0. In the closed state of the shutter 4, a monochromatic ray from the light source 3 is reflected on the diffusive/reflective surface of the shutter 4, and passes through the first slit SL0 and the second slit SL1, respectively. In such an arrangement, a flux of monochromatic rays from the light source 3 are allowed to pass through the first slit SL0 and the second slit SL1 by providing the diffusive/reflective surface on the backside surface of the shutter 4 which is generally equipped in a luminance meter for measuring an offset signal.

It is possible to adopt the following two modifications as an arrangement of the polychrometer in the spectrometer according to the embodiment of the present invention.

Figure 4:
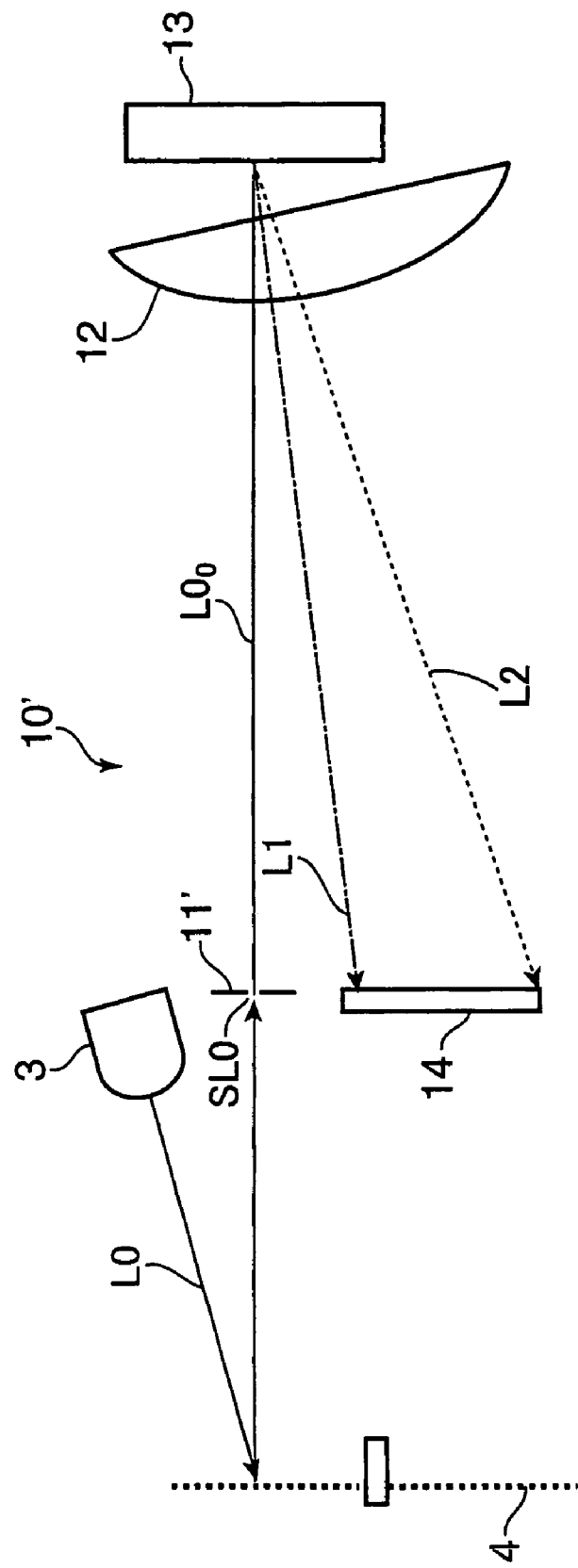
FIG. 4 is an illustration showing an arrangement of a first modified polychrometer in the embodiment of the present invention.

FIG. 4 shows an arrangement of the polychrometer as a first modification of the embodiment. The polychrometer 10 in the above embodiment is so constructed as to receive the primary dispersed light image and the second dispersed light image of a monochromatic ray that have passed through the first slit SL0 and the second slit SL1, respectively on the imaging plane of the sensor array 14. A polychrometer 10' in the first modification has a single slit SL0 and is so constructed as to receive primary and secondary dispersed light images of a monochromatic ray that has passed through the single slit SL0 at different positions on an imaging plane of a sensor array 14. As shown in FIG. 4, the polychrometer 10' includes a slit member 11', a collimator lens 12, a diffraction grating 13, and the sensor array 14. The single slit SL0 is formed in the slit member 11'.

In the first modification, a monochromatic ray L0 from a light source 3 is reflected on a diffusive/reflective surface of a shutter 4, and passes through the slit SL0 formed in the slit member 11' as a monochromatic ray $LO_0$. The monochromatic ray $LO_0$ that has passed through the slit SL0 is then collimated into a parallel ray by the collimator lens 12, and impinges on the diffraction grating 13. After passing through the slit SL0 and impinging on the diffraction grating 13, the monochromatic ray $LO_0$ is dispersed on the diffraction grating 13 as a primary ray L1 and a secondary ray L2. The primary ray L1 and the secondary ray L2 are incident on the sensor array 14 at different positions after passing through the collimator lens 12. Thus, a primary dispersed light image and a secondary dispersed light image of the monochromatic ray $LO_0$ are imaged on the sensor array 14.

Figure 5:
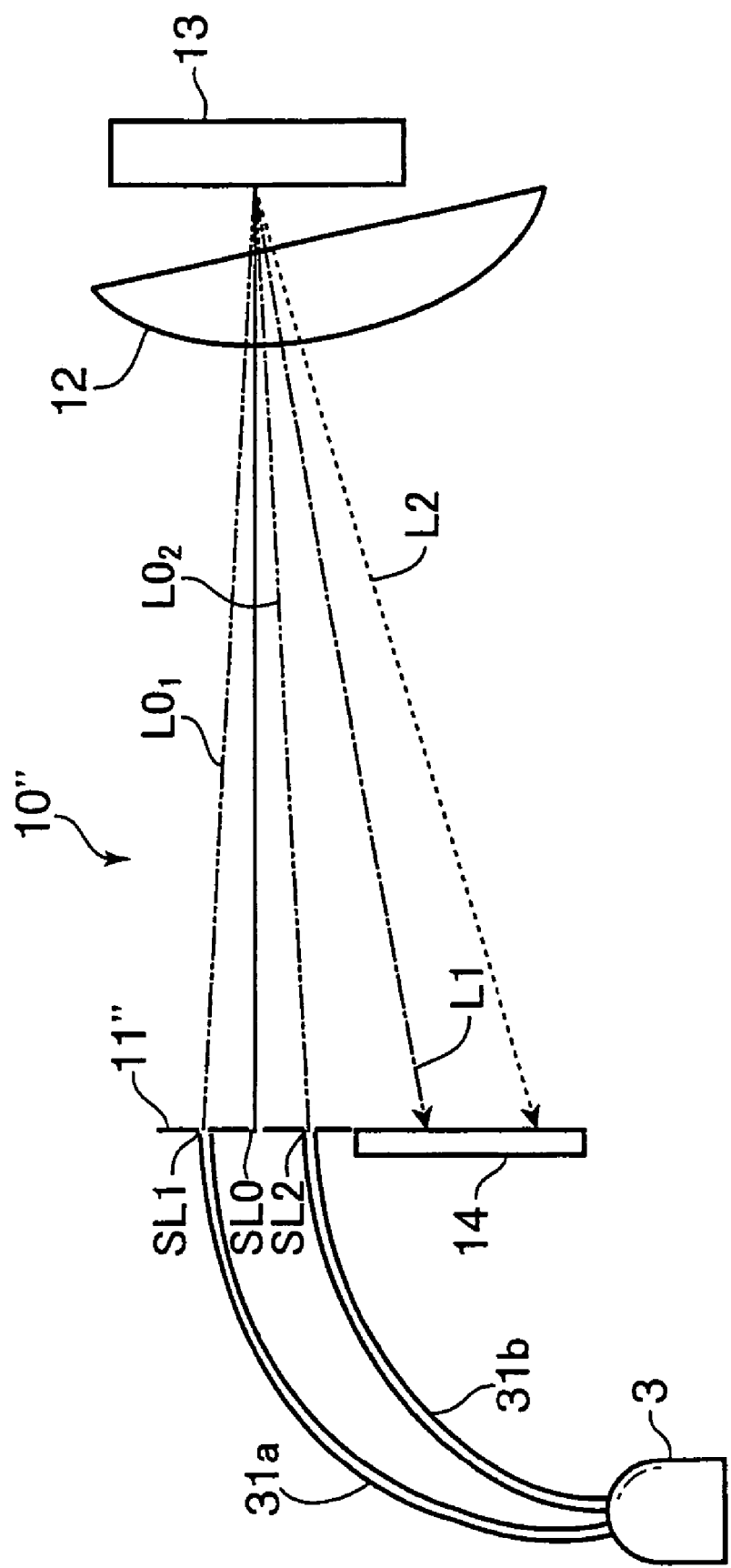
FIG. 5 is an illustration showing an arrangement of a second modified polychrometer in the embodiment of the present invention.

FIG. 5 shows an arrangement of a polychrometer as a second modification of the embodiment. The polychrometer 10 in the above embodiment is so constructed as to receive the primary dispersed light image and the second dispersed light image of the monochromatic ray that have passed through the first slit SL0 and the second slit SL1, respectively at different positions on the imaging plane of the sensor array 14. A polychrometer 10" in the second modification has a first slit SL0, a second slit SL1, and a third slit SL2, wherein the first slit SL0 is used for measurement of light, and the second slit SL1 and the third slit SL2 are used for calibration of a wavelength displacement.

As shown in FIG. 5, the polychrometer 10" in the second modification includes a slit member 11", a collimator lens 12, a diffraction grating 13, and a sensor array 14. The slit member 11" is formed with the first slit SL0, the second slit SL1, and the third slit SL2. A light source 3 and the second slit SL1 are connected with each other via an optical fiber 31a, and the light source 3 and the third slit SL2 are connected with each other via an optical fiber 31b.

In the second modification, a monochromatic ray L0 from the light source 3 passes through the second slit SL1 formed in the slit member 11" via the optical fiber 31a as a monochromatic ray $LO_1$, whereas the monochromatic ray L0 from the light source 3 passes through the third slit SL2 formed in the slit member 11" via the optical fiber 31b as a monochromatic ray $LO_2$. The monochromatic rays $LO_1$ and $LO_2$ that have passed through the second slit SL1 and the third slit SL2 are collimated into parallel rays by the collimator lens 12 and impinge on the diffraction grating 13. The monochromatic ray $LO_1$ that has passed through the second slit SL1 and impinges on the diffraction grating 13 is dispersed on the diffraction grating 13 as a primary ray L1. The primary ray L1 is then incident on the sensor array 14 via the collimator lens 12. Thus, a primary dispersed light image is imaged at a certain position on an imaging plane of the sensor array 14 after passing through the second slit SL1 and being dispersed on the diffraction grating 13. The monochromatic ray LO$_2$ that has passed through the third slit SL1 and impinges on the diffraction grating 13 is dispersed on the diffraction grating 13 as a secondary ray L2. The secondary ray L2 is then incident on the sensor array 14 via the collimator lens 12. Thus, a secondary dispersed light image is imaged at a certain position on the imaging plane of the sensor array 14 after passing through the third slit SL2 and being dispersed on the diffraction grating 13.

In this way, the first slit SL0 for passing light for measurement, and the second and third slits SL1, SL2 for correcting a wavelength displacement of the spectrometer constitute an incident slit unit, wherein a monochromatic ray from the light source 3 passes through the second slit SL1 and the third slit SL2, and an image displacement amount free of an influence due to a wavelength fluctuation of the monochromatic ray is obtained based on the primary dispersed light image of the monochromatic ray that has passed through the second slit SL1 and the secondary dispersed light image of the monochromatic ray that has passed through the third slit SL2, or based on the secondary dispersed light image of the monochromatic ray that has passed through the second slit SL1 and the primary dispersed light image of the monochromatic ray that has passed through the third slit SL2.

In the above arrangement, since the first slit SL0 for passing light for measurement, and the second and third slits SL1, SL2 for correcting a wavelength displacement are formed individually, a light source for emitting a monochromatic ray in a further longer wavelength can be used as the light source 3.

Next, a calibration method in the spectrometer is described. Three calibration methods are applicable to the spectrometer: calibration based on estimation, calibration based on actual measurement, and calibration based on a fixed value. Calibration of a wavelength displacement amount of the spectrometer is performed by adopting one of the three methods.

(Calibration Based on Estimation)

This calibration is applied to the arrangement shown in FIG. 1 in which the two slits SL0 and SL1 are formed. The calibration is carried out based on an assumption that a spectral sensitivity profile of the sensor array 14 is known with respect to a dispersed light image imaged through the first slit SL0 capable of passing a monochromatic ray from a reference monochrometer, whereas a spectral sensitivity profile of the sensor array 14 is unknown with respect to a dispersed light image imaged through the second slit SL1 incapable of passing the monochromatic ray from the reference monochrometer. First, the calibration method based on estimation is described. According to the calibration method based on estimation, an image displacement amount is obtained in terms of a displacement amount of the sensor of the sensor number n. The displacement amount of the sensor of the sensor number n is converted into a wavelength displacement amount based on a lookup table in which the sensor numbers of the respective sensors and the central wavelengths of the respective sensors are correlated to each other.

Figure 6:
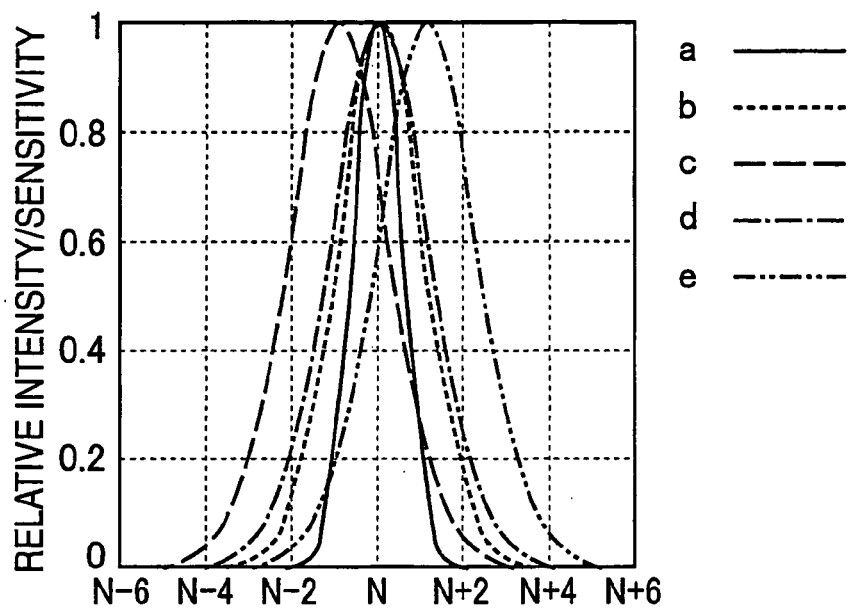
FIG. 6 is a graph showing spectral intensity profiles of primary and secondary dispersed light images of a monochromatic ray having a half bandwidth of 12 nm with respect to the sensor of the sensor number n, and spectral sensitivity profiles of the sensor of the sensor number n with respect to primary and secondary dispersed light images of a monochromatic ray having a half bandwidth of 28 nm.

FIG. 6 shows spectral intensity profiles of a monochromatic ray having a half bandwidth of 12 nm with respect to the sensor of the sensor number n, and spectral sensitivity profiles of three sensors with respect to a primary dispersed light image and a secondary dispersed light image of a monochromatic ray having a half bandwidth of 28 nm. Specifically, in FIG. 6, the solid line a represents a spectral intensity profile of a primary ray; the solid line b represents a spectral intensity profile of a secondary ray; and the broken line c, the one-dotted-dashed line d, and the two-dotted-dashed line e respectively represent spectral sensitivity profiles of the sensors of the sensor number n=N−1, N, N+1 with respect to a primary dispersed light image and a secondary dispersed light image.

Figure 7:
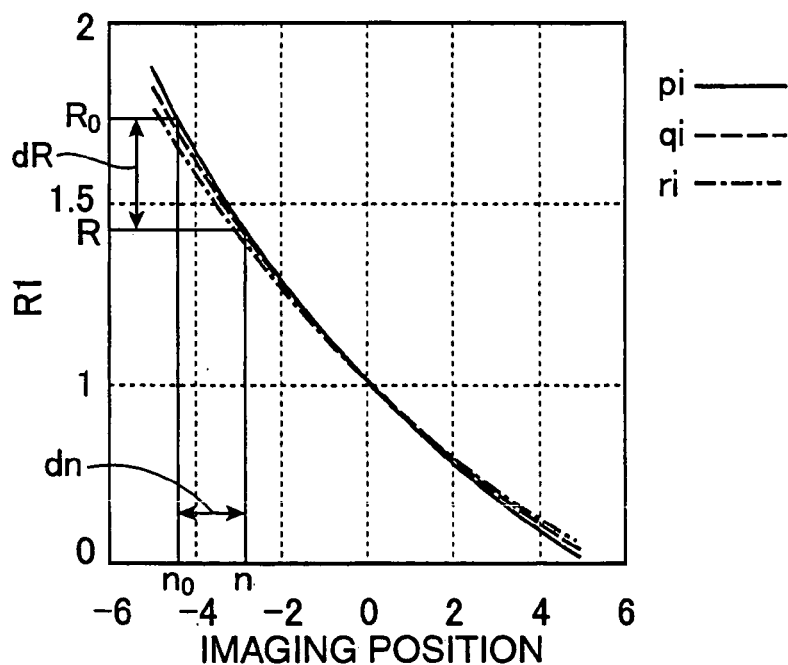
FIG. 7 is a graph showing a relationship between an imaging position n and an output ratio of the sensors (n=N−1, N+1) in the case where a primary dispersed light image of a half bandwidth Δn=1.0, 1.2, 1.4 (corresponding to 10 nm, 12 nm, 14 nm) is displaced relative to a middle position of the three sensors (n=N−1, N, N+1) by a distance ranging from −0.5 to +0.5.

FIG. 7 shows an output ratio R of the sensor of the sensor number n=N−1 to the sensor of the sensor number n=N+1 when an image is displaced relative to the middle position of the three sensors of the sensor number n=N−1, N, N+1 by a distance ranging from −0.5 to +0.5. FIG. 7 shows a relationship between an imaging position n and an output ratio R1 with respect to the primary dispersed light image of a monochromatic ray having a half bandwidth Δn=1.0, 1.2, 1.4 (corresponding to 10 nm, 12 nm, 14 nm). Specifically, in FIG. 7, the solid line pi represents a relationship between an imaging position n and an output ratio R1 with respect to the primary dispersed light image of a monochromatic ray having a half bandwidth Δn=1.0; the broken line qi represents a relationship between an imaging position n and the output ratio R 1 with respect to the primary dispersed light image of a monochromatic ray having a half bandwidth Δn=1.2; and the one-dotted-dashed line ri represents a relationship between an imaging position n and the output ratio R1 with respect to the primary dispersed light image of a monochromatic ray having a half bandwidth Δn=1.4.

As shown in FIG. 7, a variation dR of the output ratio R can be converted into a variation dn in the sensor number n. An image displacement calibration is performed by finding a correlation between the output ratio R and the sensor number n with respect to the primary and secondary dispersed light images. In such an arrangement, a user is only required to monitor the value dR/dn because a variation dR (dR=R−R$_0$) of the output ratio R from an initial output ratio R$_0$ is converted to a variation dn of the sensor number n.

The method for calibrating a wavelength displacement based on estimation is performed under the following conditions (A) through (F).

(A) The spectral sensitivities of the respective sensors of the sensor array 14 having the sensor number n with respect to the primary dispersed light image are known;

(B) The spectral sensitivities of the respective sensors of the sensor array 14 having the sensor number n with respect to the secondary dispersed light image, and the spectral distribution of a monochromatic ray from the light source 3 are approximated by mathematical functions, respectively (in both cases, using a gauss function);

(C) A central wavelength is varied with time, but a half bandwidth is not varied with respect to the spectral sensitivities of the respective sensors of the sensor array 14 and the spectral distribution of a monochromatic ray from the light source 3;

(D) The respective sensors of the sensor array 14 are arrayed at an equidistance from each other;

(E) The spectral sensitivities of the adjacent sensors of the sensor array 14 have an analogous shape to each other, and their central wavelengths thereof are apart from each other equidistantly; and (F) The outputs of the respective sensors of the sensor array 14 with respect to the primary ray are gain corrected based on a gain correction coefficient Cg(n) which is defined with respect to the primary ray. The outputs of the respective sensors of the sensor array 14 with respect to the secondary ray are gain corrected based on a gain correction coefficient Cg(n) which is defined with respect to the secondary ray and a gain ratio Rg(n), which is a ratio of a gain with respect to the secondary ray to a gain with respect to the primary ray. The gain ratio Rg(n) is approximated to Rg(n)=a×(n−n$_0$) with respect to the sensors adjacent to each other, where n is a sensor number, n$_0$ is a reference sensor number, and a is a constant.

In the following, procedures of the calibration to be carried out in the factory are described.

In the factory, first, a flux of monochromatic rays having an equi-optic energy are emitted from the monochrometer and pass through the first slit SL0 of the polychrometer 10 for light measurement. The calculation controller 6 calculates a spectral sensitivity S1$_n$(W) of the respective sensors of the sensor array 14 with respect to a primary dispersed light image, and obtains a central wavelength wc$_n$. Then, the calculation controller 6 calculates a gain correction coefficient Cg(n) with respect to a primary ray received on the respective sensors including an optical gain and a circuit gain based on the spectral sensitivity S1$_n$(w) of the respective sensors.

Next, the calculation controller 6 controls the light source 3 to emit a monochromatic ray, and approximates the spectral intensity of the monochromatic ray by a gauss function G(w) based on outputs of five sensors of the sensor array 14 substantially covering the primary dispersed light image after correcting the spectral sensitivities of the five sensors, and the corresponding spectral sensitivity S1 n(w). Specifically, the calculation controller 6 estimates a central wavelength wc, a half bandwidth dw, and a peak intensity of the gauss function G(w) according to a least-squares method. The calculation controller 6 converts the gauss function G(w) into a spectral intensity profile G1(n) of a primary ray of the monochromatic ray from the light source 3 with respect to the sensor of the sensor number n based on a relationship between the sensor number n and the central wavelength wc$_n$ with respect to the primary dispersed light image, wherein the half bandwidth is Δn1.

The calculation controller 6 approximates a spectral intensity profile G2(n) of a secondary ray of a monochromatic ray from the light source 3 with respect to the sensor of the sensor number n by a gauss function, wherein the half bandwidth is Δn2(=2×Δn1).

Then, the calculation controller 6 estimates a middle position nc2 of the secondary dispersed light image, a half bandwidth Δn which is common among gauss functions S2$_N$(n), S2$_{N±1}$(n), S2$_{N±2}$(n) and is used for approximating the spectral sensitivity profiles of the five sensors, and a constant a which determines the gain ratio Rg(n) based on the corrected outputs of the five sensors (sensor number n=N, N±1, N±2) with respect to the secondary dispersed light image of a monochromatic ray, according to a least-squares method.

The calculation controller 6 obtains, according to computation, relative outputs of the five sensors in a primary imaging region where the primary dispersed light image is imaged and in a secondary imaging region where the secondary dispersed light image is imaged at a time when the imaging positions of the primary and secondary dispersed light images are displaced, based on the estimated spectral intensity profiles G1(n) and G2(n) of the primary and secondary rays, the known spectral sensitivity profiles S1$_N$(n), S1$_{N±1}$(n), S1$_{N±2}$(n) of the five sensors with respect to the primary ray in the primary imaging region, and the known sensitivity profiles S2$_N$(n), S2$_{N±1}$(n), S2$_{N±2}$(n) of the five sensors with respect to the secondary ray in the secondary imaging region.

The calculation controller 6, then, generates a first lookup table in which the imaging position n at which the central wavelength of the primary dispersed light image lies, and the output ratio R1 of the two adjacent sensors interposing the sensor at the imaging position n therebetween are correlated to each other, and a second lookup table in which the imaging position n at which the central wavelength of the secondary dispersed light image lies, and the output ratio R2 of the two adjacent sensors interposing the sensor at the imaging position n therebetween are correlated to each other.

The calculation controller 6 calculates and stores initial values R1$_0$ and R2$_0$ of the output ratios R1 and R2 in advance based on the outputs of the five sensors in the primary imaging region whose sensitivities have been corrected, and on the outputs of the five sensors in the secondary imaging region whose sensitivities have been corrected.

The above procedures are what is implemented in the factory. Next, procedures to be implemented on the user side are described.

The calculation controller 6 controls the light source 3 to emit a monochromatic ray. The calculation controller 6 calculates the output ratio R1 of the two sensors adjacent to the sensor of the sensor array 14 at which the central wavelength of a primary dispersed light image of the monochromatic ray from the light source 3 lies, and the output ratio R2 of the two sensors adjacent to the sensor of the sensor array 14 at which the central wavelength of a secondary dispersed light image of the monochromatic ray from the light source 3 lies.

Next, the calculation controller 6 converts a variation of the output ratio R1 from the initial value R1$_0$ and a variation of the output ratio R2 from the initial value R2$_0$ into a first image displacement amount d1 and a second image displacement amount d2 based on the first lookup table and the second lookup table, respectively.

The calculation controller 6, then, calculates an image displacement amount dx resulting from a mechanical change of the polychrometer according to the equation (4), and converts the image displacement amount dx into a wavelength displacement amount based on the first lookup table in which the sensor number n and the central wavelength wc$_n$ are correlated to each other.

In this way, a monochromatic ray from the light source 3 is passed through the first slit SL0 and the second slit SL1, a displacement amount of the imaging position of the primary dispersed light image from its initial position is obtained as the first image displacement amount d1, and a displacement amount of the imaging position of the secondary dispersed light image from its initial position is obtained as the second image displacement amount d2. The image displacement amount dx free of a wavelength fluctuation of the monochromatic ray is obtained based on the first and second image displacement amounts d1 and d2. The image displacement amount dx is converted into a wavelength displacement amount based on the first lookup table in which the sensor number n and the central wavelength wc$_n$ are correlated to each other.

In the above arrangement, a wavelength displacement can be corrected based on the light source 3 for outputting a monochromatic ray. This arrangement is advantageous in securing precision with respect to wavelengths at the time of initial calibration of the wavelengths because a wavelength displacement can be corrected even if a wavelength displacement occurs resulting from a positional displacement of the respective optical elements in the polychrometer to the support structure with time and thermal change.

It should be noted that a wavelength displacement is corrected by correcting all the correlations between the sensor number n and the corresponding central wavelength $wc_n$ in the lookup table all at once based on the image displacement amount dx or the wavelength displacement amount dwx for light measurement.

Further, the image displacement amount dx free of an influence due to a wavelength fluctuation of a monochromatic ray can be obtained by the equation: $dx=2 \times d1-d2$ where d1 is a first image displacement amount, d2 is a second image displacement amount, and dx is an image displacement amount free of an influence due to a wavelength fluctuation of a monochromatic ray.

Further, stored is information for converting variations in the relative ratios R1 and R2 of the outputs of the respective sensors in the primary and secondary imaging regions from the first and second initial values $R1_0$ and $R2_0$ into the first and second image displacement amounts d1 and d2, respectively. In such an arrangement, the first and second image displacement amounts d1 and d2 are calculated easily based on the relative ratios R1 and R2 and the first and second initial values $R1_0$ and $R2_0$.

Also, calculated are outputs of the respective sensors in the primary imaging region and in the secondary imaging region when the monochromatic ray from the light source 3 is passed through the first slit SL0 and the second slit SL1. Then, a half bandwidth of a spectral intensity profile of the primary dispersed light image is estimated based on a relative ratio of the outputs of the respective sensors in the primary imaging region, and the known spectral sensitivity profiles of the respective sensors in the primary imaging region. A relative ratio of the outputs of the respective sensors in correspondence to a displacement of the primary dispersed light image is calculated and stored based on a spectral intensity profile of the primary dispersed light image obtained by displacing a middle position of the spectral intensity profile of the primary dispersed light image by a certain value, and the known spectral sensitivity profiles of the respective sensors in the primary imaging region. A spectral intensity profile of the secondary dispersed light image is estimated based on the calculated spectral intensity profile of the primary dispersed light image. Spectral sensitivity profiles of the respective sensors in the secondary imaging region are estimated based on the estimated spectral intensity profile of the secondary dispersed light image and a relative ratio of the outputs of the respective sensors in the secondary imaging region. At last, a relative ratio R2 of the outputs of the respective sensors in correspondence to a displacement of the secondary dispersed light image is calculated and stored based on a spectral intensity profile of the secondary dispersed light image obtained by displacing a middle position of the estimated spectral intensity profile of the secondary dispersed light image by a certain value, and the estimated spectral sensitivity profiles of the respective sensors in the secondary imaging region.

The above arrangement is advantageous in obtaining information for converting respective variations in the relative ratios R1 and R2 of the outputs of the respective sensors in the primary and secondary imaging regions from the initial values $R1_0$ and $R2_0$ into the first and second image displacement amounts d1 and d2 without using an external light source for emitting a monochromatic ray.

Further, unknown spectral sensitivity profiles of the respective sensors with respect to the secondary dispersed light image are estimated based on the estimated spectral intensity profile of the secondary dispersed light image and the relative ratio R2 of the outputs of the respective sensors in the secondary imaging region. In such an arrangement, even if the spectral sensitivity profiles of the respective sensors with respect to the secondary dispersed light image in the secondary imaging region are unknown, obtained is information for converting respective variations in the relative ratios R1 and R2 of the outputs of the respective sensors in the primary and secondary imaging regions from the initial values $R1_0$ and $R2_0$ into the first and second image displacement amounts d1 and d2 without using an external light source for emitting a monochromatic ray.

Furthermore, the above arrangement is advantageous in obtaining information for converting the above variations into the first and second image displacement amounts d1 and d2 without greatly affecting the precision in the information and without performing estimation of a half bandwidth which may likely to give rise to a measurement error by using the calculated mean value as the half bandwidth of the monochromatic ray.

Further, the above arrangement is advantageous in securing information for converting the variations into the first and second image displacement amounts d1 and d2 without greatly affecting the precision in the information and without performing estimation of a spectral intensity profile of the secondary dispersed light image which may likely to give rise to a measurement error by using the calculated mean spectral sensitivity as the spectral sensitivity profiles of the respective sensors in the secondary imaging region.

(Calibration Method Based on Direct Measurement)

Next, a calibration method based on direct measurement is described. In this method, assuming that a wavelength displacement amount in correspondence to the first image displacement amount d1 of the primary dispersed light image is dw1, a wavelength displacement amount in correspondence to the second image displacement amount d2 of the secondary dispersed light image is dw2, and a wavelength displacement amount in correspondence to the image displacement amount dx of the primary dispersed light image due to a mechanical change of the polychrometer is dwx, then, these parameters d1, d2, dx are expressed by the following equations (5), (6), (7), respectively.

$$d1 = D1 \times dw1 \tag{5}$$

$$d2 = D2 \times dw2 \tag{6}$$

$$dx = D1 \times dwx \tag{7}$$

Equations (8), (9) corresponding to the equations (2), (3) are derived based on the equations (1), (5), (6), (7).

$$dw1 = dw + dwx \tag{8}$$

$$dw2 = dw + dwx/2 \tag{9}$$

The wavelength displacement amount dwx can be expressed by the equation (10) based on the equations (8), (9).

$$dwx = 2 \times (dw1 - dw2) \tag{10}$$

As shown in FIG. 2, the first wavelength displacement amount dw1 of the primary dispersed light image is calculated based on dR1, which is a variation of the output ratio R1=S1/S3 where S1 is an output of the sensor #1, and S3 is an output of the sensor #3, and the sensors #1 and #3 are arranged with the sensor #2 being interposed therebetween. The second wavelength displacement amount dw2 of the secondary dispersed light image is calculated based on dR2, which is a variation of the output ratio R2=S38/S40 where S38 is an output of the sensor #38, and S40 is an output of the sensor #40, and the sensors #38 and #40 are arranged with the sensor #39 being interposed therebetween. Specifically, the first wavelength displacement amount dw1 of the primary dispersed light image and the second wavelength displacement amount dw2 of the secondary dispersed light image are expressed by the following equations (11), (12), respectively.

$$dw1 = K1 \times dR1 \quad (11)$$

$$dw2 = K2 \times dR2 \quad (12)$$

where dw1 is the first wavelength displacement amount of the primary dispersed light image, dw2 is the second wavelength displacement amount of the secondary dispersed light image, K1 and K2 are proportionality constants inherent to polychrometers individually, dR1 is a variation of the output ratio of the two sensors adjacent to the sensor at which the central wavelength of the primary dispersed light image lies, and dR2 is a variation of the output ratio of the two sensors adjacent to the sensor at which the central wavelength of the secondary dispersed light image lies.

As shown by the equations (11), (12), the first wavelength displacement amount dw1 of the primary dispersed light image and the second wavelength displacement amount dw2 of the secondary dispersed light image can be obtained by determining the proportionality constants K1 and K2, whereby the wavelength displacement amount dwx is calibrated.

Now, calibration procedures to be performed in the factory are described.

In the factory, first, the calculation controller 6 controls the reference monochrometer to emit a monochromatic ray of a central wavelength $w0_j$ (j=1, 2, 3) of 365 nm, 370 nm, 375 nm at a half bandwidth substantially equal to that of a monochromatic ray from the light source 3, and obtains output ratios $R1_j$ and $R2_j$. Specifically, three monochromatic rays of wavelengths of 365 nm, 370 nm, 375 nm are emitted based on the assumption that the wavelength of the monochromatic ray from the light source 3 is in the range of 370±5 nm, and an estimated wavelength displacement amount of the polychrometer is ±1 nm, and considering an operation time required for the calibration.

Regarding the primary dispersed light image, w1 is approximated by a quadratic function of R1: $w1 = W1(R1) = C1 \times R1^2 + D1 \times R1 + E1$ under the condition: $w1 = w0$, wherein the coefficients C1, D1, E1 are obtained based on a relation between $w0_j$ and $R1_j$. Also, its derived function $W1'(R1) = C1 \times R1 + D1$ is obtained. Regarding the secondary dispersed light image, a quadratic function: $W2(R2) = C2 \times R2^2 + D2 \times R2 + E2$ and its derived function $W2'(R2) = C2 \times R2 + D2$ are obtained.

The calculation controller 6 controls the light source 3 to emit a monochromatic ray, and calculates and stores initial values $R1_0$ and $R2_0$ of the aforementioned output ratios R1 and R2 of the sensors with respect to the monochromatic ray from the light source 3.

The calculation controller 6, then, substitutes the initial values $R1_0$ and $R2_0$ for the derived functions $W1'(R1)$ and $W2'(R2)$, and obtains and stores the proportionality coefficients $K1 = W1'(R1_0)$ and $K2 = W2'(R2_0)$.

The above procedures are what is implemented in the factory. Next, procedures to be implemented on the user side are described.

The calculation controller 6 controls the light source 3 to emit a monochromatic ray, and calculates an output ratio R1 of the two sensors adjacent to the sensor of the sensor array 14 at which the central wavelength of a primary dispersed light image of the monochromatic ray from the light source 3 lies, and an output ratio R2 of the two sensors adjacent to the sensor of the sensor array 14 at which the central wavelength of a secondary dispersed light image of the monochromatic ray from the light source 3 lies.

Then, the calculation controller 6 calculates variations $dR1(=R1-R1_0)$ and $dR2(=R2-R2_0)$ of the output ratios R1 and R2 from the initial values $R1_0$ and $R2_0$ which have been stored in advance, respectively.

The calculation controller 6 converts the variations dR1 and dR2 into first and second wavelength displacement amounts dw1 and dw2 according to the equations (11), (12) with use of the proportionality constants K1 and K2, respectively.

Next, the calculation controller 6 calculates a wavelength displacement amount dwx due to a mechanical change of the polychrometer according to the equation (10).

The calibration method based on actual measurement is suitable to the polychrometer 10' shown in FIG. 4 which is designed to pass a monochromatic ray from a monochrometer through the slit easily. In this arrangement, an influence of a half bandwidth of a monochromatic ray should be considered. However, such an influence is negligibly small. Further, this arrangement requires a monochromatic ray to pass through the slit individually with respect to each product (spectrometer). However, such an operation is not cumbersome in measurement of spectral sensitivities of the sensors of the sensor array with use of the monochrometer.

As mentioned above, monochromatic rays having a half bandwidth substantially identical to that of a monochromatic ray from the light source 3 and having known different central wavelengths from each other with respect to each wavelength component are allowed to passed through the slit SL0, and calculated and stored are the proportionality coefficients K1 and K2, which are the information for converting the variations in the imaging positions of the primary and secondary dispersed light images into the first and second wavelength displacement amounts dw1 and dw2, based on the relative ratios R1, R2 of the outputs of the respective sensors in the primary and secondary imaging regions.

In the above arrangement, merely preparing a plurality of external light sources for emitting monochromatic rays is sufficient in obtaining the proportionality coefficients K1, K2, which are the information for converting the variations in the imaging positions of the primary and secondary dispersed light images into the first and second wavelength displacement amounts dw1 and dw2.

(Calibration Method Based on Fixed Value)

Next, a calibration method based on a fixed value is described. In this method, an averaged relation between dn and R is applied to all the products (spectrometers) in place of an arrangement in which a relation between dn and R is obtained individually with respect to each polychrometer incorporated in the product (spectrometer). The calibration according to this method is made based on the sensor number n in place of the wavelength in the similar manner as the aforementioned methods, and an image displacement is processed in terms of a variation dn in the imaging position n in place of a wavelength. In such an arrangement, an influence due to a fluctuation of the central wavelength of the respective sensors of the sensor array 14 can be neglected, and easy handling is realized.

Figure 8:
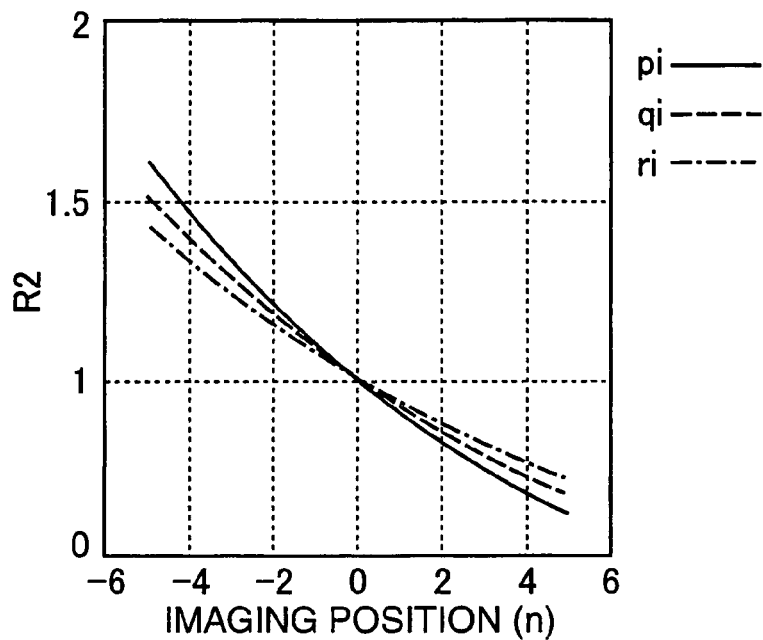
FIG. 8 is a graph showing a relationship between an imaging position n and an output ratio R2 of the sensors (n=N−1, N+1) with respect to a secondary dispersed light image of a half bandwidth Δn=2.0, 2.4, 2.8 (corresponding to 10 nm, 12 nm, 14 nm).
Figure 9:
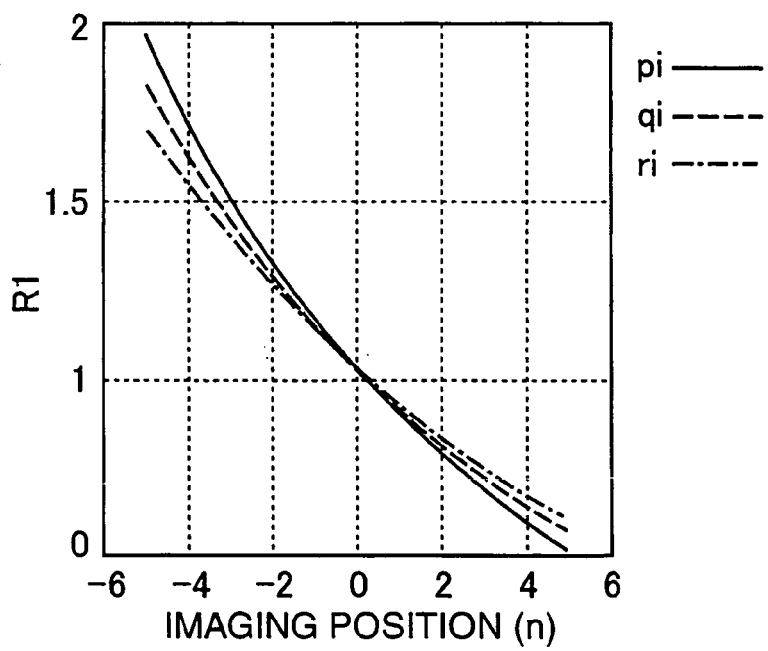
FIG. 9 is a graph showing a relationship between an imaging position n and the output ratio R1 of the two sensors (n=N−1, N+1) in the case where a primary dispersed light image of a monochromatic ray having a half bandwidth of Δn=1.2 is imaged on three sensors (n=N−1, N, N+1) having respective sensitivity profiles of a half bandwidth Δn=2.6, 2.8, 3.0 (corresponding to 26 nm, 28 nm, 30 nm).
Figure 10:
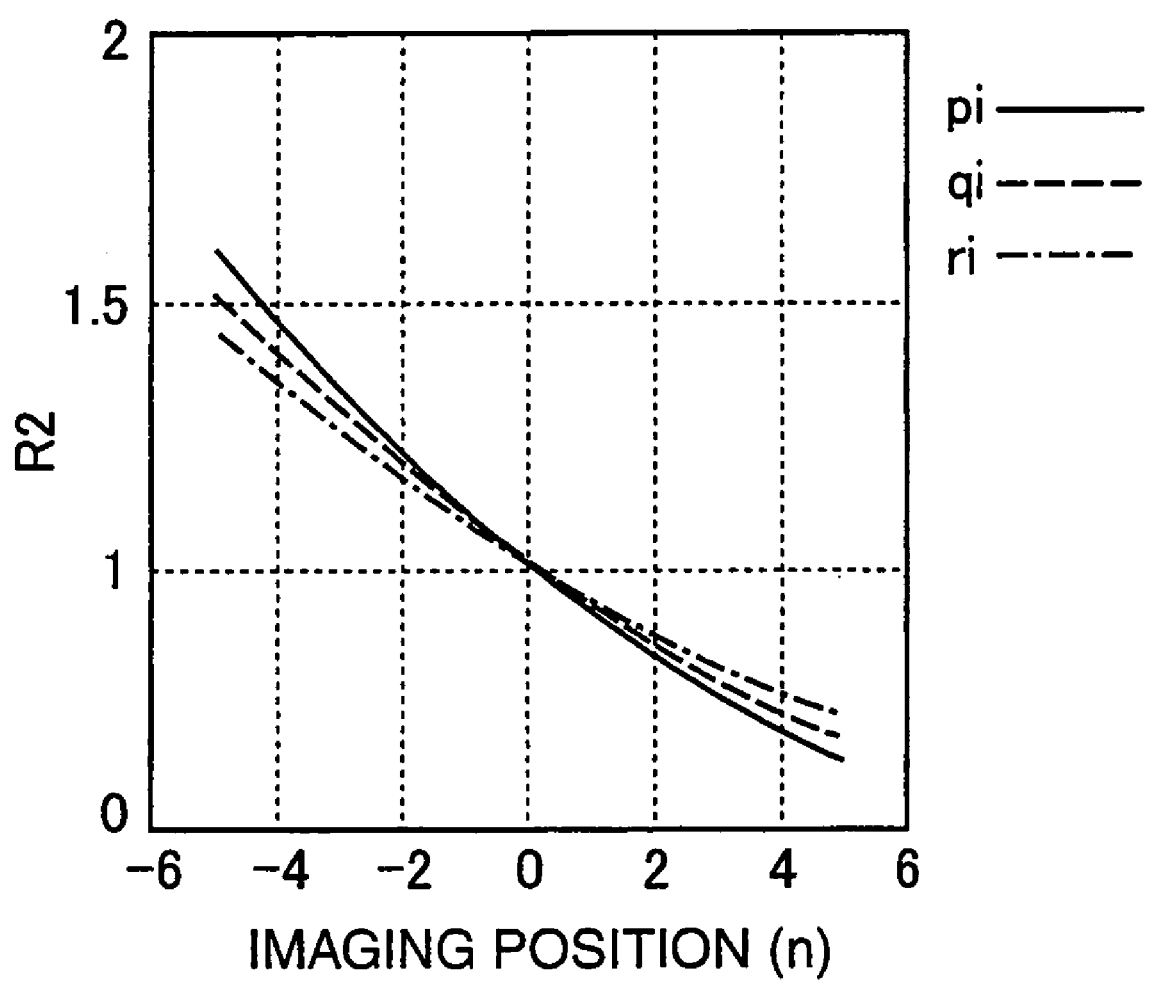
FIG. 10 is a graph showing a relationship between an imaging position n and the output ratio R2 of the two sensors (n=N−1, N+1) in the case where a secondary dispersed light image of a monochromatic ray having a half bandwidth of Δn=2.4 is imaged on three sensors (n=N−1, N, N+1) having respective sensitivity profiles of a half bandwidth Δn=2.6, 2.8, 3.0 (corresponding to 13 nm, 14 nm, 15 nm).

FIG. 8 is an illustration showing a relation between the imaging position n of a secondary dispersed light image of a monochromatic ray having a half bandwidth $\Delta n=2.0, 2.4, 2.8$ (corresponding to 10 nm, 12 nm, 14 nm), and an output ratio R2. FIG. 9 is an illustration showing a relation between the imaging position n of a primary dispersed light image of a monochromatic ray having a half bandwidth $\Delta n=1.2$ on the sensors of the sensor array 14 having respective spectral sensitivities of a half bandwidth $\Delta n=2.6, 2.8, 3.0$ (corresponding to 26 nm, 28 nm, 30 nm), and an output ratio R1. FIG. 10 is an illustration showing a relation between the imaging position n of a secondary dispersed light image of a monochromatic ray having a half bandwidth $\Delta n=2.4$ on the sensors of the sensor array 14 having respective spectral sensitivities of a half bandwidth $\Delta n=2.6, 2.8, 3.0$ (corresponding to 13 nm, 14 nm, 15 nm), and an output ratio R2.

In FIG. 8, the solid line pi represents a relation between the imaging position n of a secondary dispersed light image of a monochromatic ray having a half bandwidth $\Delta n=2.0$, and the output ratio R2; the dashed line qi represents a relation between the imaging position n of a secondary dispersed light image of a monochromatic ray having a half bandwidth $\Delta n=2.4$, and the output ratio R2; and the one-dotted-dashed line ri represents a relation between the imaging position n of a secondary dispersed light image of a monochromatic ray having a half bandwidth $\Delta n=2.8$, and the output ratio R2.

In FIG. 9, the solid line pi represents a relation between the imaging position n of a primary dispersed light image of a monochromatic ray having a half bandwidth $\Delta n=1.2$ on the sensor array 14 having a spectral sensitivity profile of a half bandwidth $\Delta n=2.6$, and the output ratio R1; the dashed line qi represents a relation between the imaging position n of a primary dispersed light image of a monochromatic ray having a half bandwidth $\Delta n=1.2$ on the sensor array 14 having a spectral sensitivity profile of a half bandwidth $\Delta n=2.8$, and the output ratio R1; and the one-dotted-dashed line ri represents a relation between the imaging position n of a primary dispersed light image of a monochromatic ray having a half bandwidth $\Delta n=1.2$ on the sensor array 14 having a spectral sensitivity profile of a half bandwidth $\Delta n=3.0$, and the output ratio R1.

Similarly to FIG. 9, in FIG. 10, the solid line pi represents a relation between the imaging position n of a secondary dispersed light image of a monochromatic ray having a half bandwidth $\Delta n=2.4$ on the sensor array 14 having a spectral sensitivity profile of a half bandwidth $\Delta n=2.6$, and the output ratio R2; the dashed line qi represents a relation between the imaging position n of a secondary dispersed light image of a monochromatic ray having a half bandwidth $\Delta n=2.4$ on the sensor array 14 having a spectral sensitivity profile of a half bandwidth $\Delta n=2.8$, and the output ratio R2; and the one-dotted-dashed line ri represents a relation between the imaging position n of a secondary dispersed light image of a monochromatic ray having a half bandwidth $\Delta n=2.4$ on the sensor array 14 having a spectral sensitivity profile of a half bandwidth $\Delta n=3.0$, and the output ratio R2.

Referring to FIGS. 7 and 8, let's observe how gradients dR1/dn and dR2/dn with respect to the primary and secondary dispersed light images are varied when the half bandwidth $\Delta n$ of a monochromatic ray is displaced by 0.2. If the imaging position n is displaced from dn=−0.3 to −0.2, the respective gradients dR1/dn, dR2/dn are 0.067 and 0.155. However, the gradients dR1/dn and dR2/dn have orientations identical to each other, and dx is merely 0.02 where dx is obtained by implementing the equation: dx=2×d1−d2. Thus, even if the half bandwidth $\Delta n$ of a monochromatic ray is displaced by 0.2, such a displacement does not cause a significant measurement error.

Referring to FIGS. 9 and 10, let's observe how the gradients dR1/dn and dR2/dn with respect to the primary and secondary dispersed light images are varied when the half bandwidths $\Delta n1$ and $\Delta n2$ of spectral sensitivity profiles of the sensor array 14 are displaced by 0.2. If the imaging position n is displaced from dn=−0.3 to −0.2, the respective gradients dR1/dn, dR2/dn are 0.095 and 0.096. Here, it is not always the case that the gradients dR1/dn and dR2/dn have orientations identical to each other. Further, dx is about 0.3. Thus, if the half bandwidths $\Delta n1$ and $\Delta n2$ of spectral sensitivity profiles of the sensor array 14 are displaced by 0.2, such a displacement may cause a significant measurement error.

In view of the above, in this arrangement, a fixed relation between the imaging position n and the output ratio R2 with respect to the secondary dispersed light image is utilized. As far as the primary dispersed light image is concerned, half bandwidths of the spectral sensitivity profiles of the respective sensors of the sensor array 14 with respect to the primary dispersed light image are obtained individually, and the relation between the imaging position n and the output ratio R1 is determined according to computation while using a fixed half bandwidth of the monochromatic ray from the light source, whereby a measurement error in an image displacement of the primary dispersed light image can be remarkably reduced. As a result of the above procedures, a resultant measurement error due to displacement of the secondary dispersed light image is suppressed as low as about 10%. This arrangement secures high correction precision even if a total measurement error is presumed to be 20%, twice as high as the predicted maximal measurement error (=10%) due to displacement of the secondary dispersed light image. Half bandwidths of the spectral sensitivities of the respective sensors with respect to the primary dispersed light image are obtained individually because this calibration method is proposed based on an idea of adopting the polychrometer 10' shown in FIG. 4 capable of measuring spectral sensitivity of the sensor array 14 with respect to the primary dispersed light image.

Now, procedures of calibration based on a fixed value are described. In the following, correction on spectral sensitivity of the sensor array 14 is omitted.

First, preliminary procedures prior to calibration are described. As the preliminary procedures, the calculation controller 6 measures spectral sensitivity profiles $S2_N(w)$, $S2_{N\pm1}(w)$, $S2_{N\pm2}(w)$ of five sensors of the sensor array 14 with respect to a secondary ray which is in association with a dispersed light image of a monochromatic ray from the light source 3. The measurement is performed with respect to a plurality of polychrometers.

The calculation controller 6, then, converts the spectral sensitivity profiles $S2_N(w)$, $S2_{N\pm1}(w)$, $S2_{N\pm2}(w)$ into gauss functions $S2_N(n)$, $S2_{N\pm1}(n)$, $S2_{N\pm2}(n)$ based on a relation between the sensor number n and the central wavelength $wc_n$ with respect to the secondary ray.

Next, the calculation controller 6 calculates a mean spectral intensity profile Ga(w), which represents a mean spectral intensity of the monochromatic ray.

The calculation controller 6 converts the mean spectral intensity profile Ga(w) into primary and secondary mean spectral intensity profiles Ga1(n), Ga2(n) based on respective relations between the sensor number n and the central wavelength $wc_n$ with respect to the primary and secondary rays.

The calculation controller 6 calculates estimated outputs of the five sensors in the secondary imaging region which reflects a displacement of the secondary dispersed light image, based on the gauss functions $S2_N(n)$, $S2_{N\pm1}(n)$, $S2_{N\pm2}(n)$, and the mean spectral intensity profile $G2a\ (n)$ whose central wavelength has been displaced by a certain value.

The calculation controller 6 generates a second lookup table in which the imaging position n of the secondary dispersed light image and the output ratio R2 of the two sensors adjacent to the sensor at which the central wavelength of the secondary dispersed light image lies are correlated with each other.

The calculation controller 6, then, generates a mean lookup table by averaging the values in the second lookup tables which have been generated with respect to the plurality of polychrometers according to the above procedures.

The above procedures are what is implemented as the preliminary procedures. Next, procedures to be implemented in the factory are described.

In the factory, the calculation controller 6 stores the mean lookup table which has been generated according to the above-mentioned manner. The calculation controller 6 converts the known spectral sensitivity $S1n(w)$ with respect to the primary ray in the primary imaging region into the spectral sensitivity profile $S1n(n)$ with respect to the imaging position n. The calculation controller 6 generates a first lookup table according to computation in which the imaging position n of the primary dispersed light image, and the output ratio R1 of the two sensors adjacent to the sensor at which the central wavelength of the primary dispersed light image lies are correlated to each other, based on the spectral sensitivity profile $S1n(n)$ and the mean spectral intensity profile $G1a\ (w)$ of the primary ray of the mean monochromatic ray with respect to the imaging position n.

The calculation controller 6 controls the light source 3 to emit a monochromatic ray, and calculates and stores the initial values $R1_0$ and $R2_0$ of the output ratios R1 and R2 of the sensors on which the primary and secondary dispersed light images are imaged based on the monochromatic ray from the light source 3.

The above is what is implemented in the factory. Next, procedures to be implemented on the user side are described.

The calculation controller 6 controls the light source 3 to emit a monochromatic ray, and calculates an output ratio R1 of the two sensors adjacent to the sensor at which the central wavelength of the primary dispersed light image of the monochromatic ray lies, and an output ratio R2 of the two sensors adjacent to the sensor at which the central wavelength of the secondary dispersed light image lies.

The calculation controller 6 converts a variation in the output ratios R1 and R2 from the initial values R10 and $R2_0$ into first and second image displacement amounts d1 and d2 with respect to the imaging position n based on the first lookup table and the second lookup table.

The calculation controller 6 calculates an image displacement amount dx due to a mechanical change of the polychrometer according to the equation (4).

Figure 11:
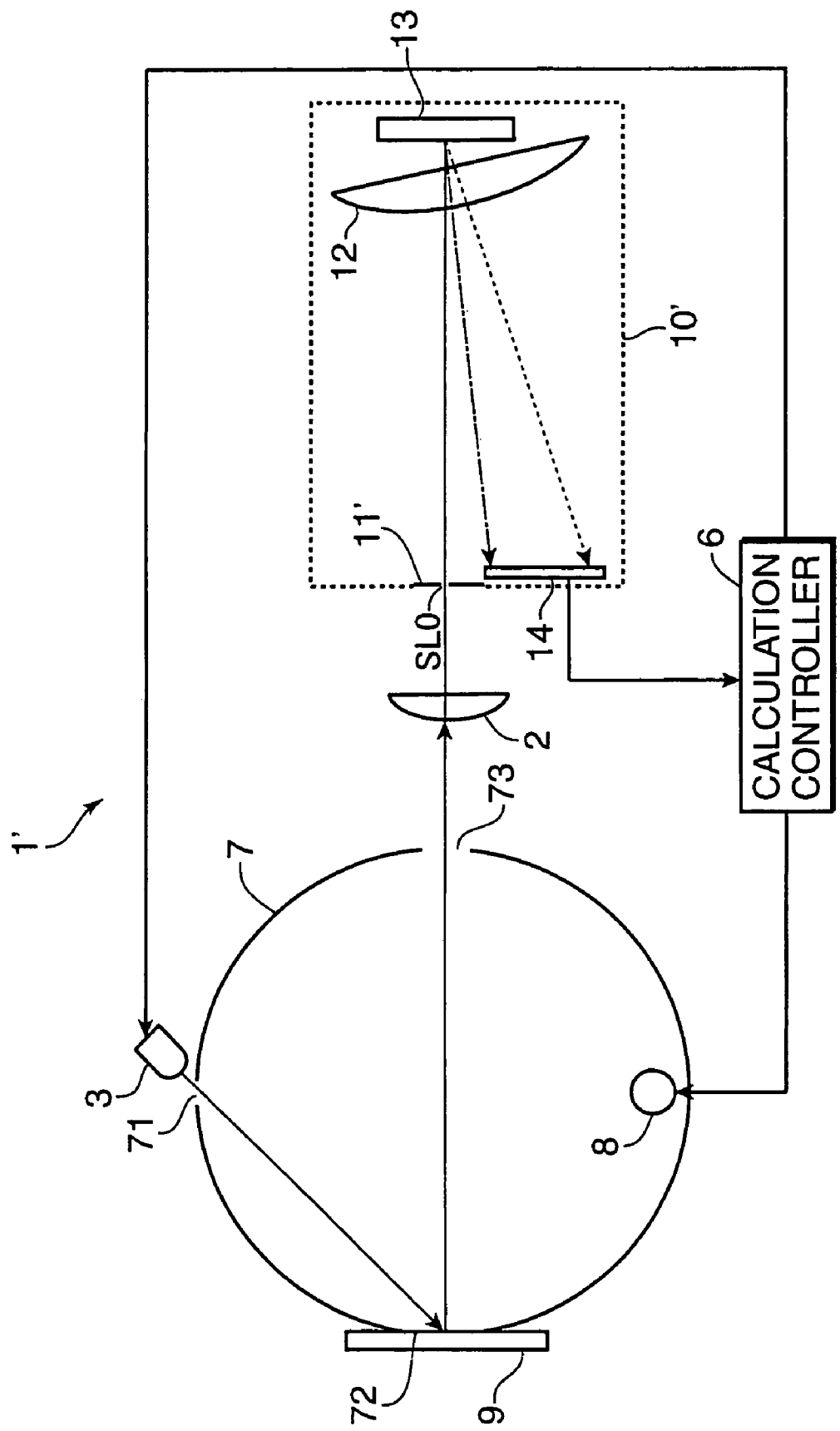
FIG. 11 is an illustration showing a vertical light receiving type spectrometric calorimeter, as an example of a spectrometer according to the embodiment of the present invention, capable of correcting a wavelength displacement.

Another embodiment is described with reference to FIG. 11. FIG. 11 shows an arrangement of a spectrometric colorimeter of a vertical light receiving type which is capable of correcting a wavelength displacement. A spectrometric colorimeter 1' shown in FIG. 11 includes a light receiving lens 2, a light source 3, a calculation controller 6, an integrating sphere 7, a sample light source 8 for illuminating a sample, and a polychrometer 10'.

The integrating sphere 7 is a hollow sphere coated with a white paint having a high dispersion ratio and a high reflectance such as magnesium oxide or barium sulfate on the inner wall thereof. The integrating sphere 7 is internally equipped with the sample light source 8 for illuminating a sample, and is so constructed that a ray from the sample light source 8 is multi-reflected on the inner wall of the integrating sphere 7 to generate diffusive rays. The sample light source 8 is, e.g., a xenon flash lamp. The integrating sphere 7 is formed with a light source opening 71 through which light from the light source 3 is passed, a sample opening 72 in which a measurement piece 9 to be measured, such as a sample or a white calibration plate is disposed, and a measurement opening 73 through which reflected light from the measurement piece 9 is passed.

The calculation controller 6 controls the sample light source 8 to emit flashlight so that vertically-oriented and reflected light which has diffusively illuminated the measurement sample 9 at the time of measurement, or vertically-oriented and reflected light which has diffusively illuminated the white calibration plate at the time of calibration passes through the sample opening 73, and passes through the slit SL0 formed in a slit member 11 of the polychrometer 10' via the lens 2. The calculation controller 6 A/D converts the outputs of respective sensors of a sensor array 14 on which a dispersed light image of the incident light is imaged, and measures a spectral intensity of the dispersed light image. Immediately after the measurement, the calculation controller 6 implements operations similar to the aforementioned operations to measure an offset signal. The calculation controller 6 obtains a spectral intensity of the light for measurement free of an offset signal component by subtracting the offset signal from the actually measured spectral intensity, and then, calculates a spectral reflectance coefficient of the sample based on a ratio of the spectral intensity of the reflected light from the sample to the spectral intensity of the reflected light from the white calibration plate.

In correction of a wavelength displacement, the calculation controller 6 controls the light source 3 to emit a monochromatic ray in a state that the white calibration plate is disposed in the sample opening 72. The monochromatic ray from the light source 3 is passed through the slit SL0 after being diffusively reflected on the white calibration plate. The calculation controller 6 A/D-converts the outputs of the respective sensors of the sensor array 14 on which primary and secondary dispersed light images of the monochromatic ray are imaged, and measures spectral intensity profiles of the primary and secondary dispersed light images. Immediately after the measurement, the calculation controller 6 controls the light source 3 to turn off the light to measure an offset signal. The calculation controller 6 obtains a spectral intensity profile of the monochromatic ray free of an offset signal component by subtracting the offset signal from the actually measured spectral intensity profile, and estimates a wavelength displacement amount according to the aforementioned method.

In the above arrangement, the measurement piece 9 is uniformly illuminated from all the directions by the diffusive rays generated in the integrating sphere 7, and the spectral intensity profiles of the reflected rays from the measurement piece 9 originated from the diffusive rays are measured, whereby a wavelength displacement amount is estimated based on the actually measured spectral intensity profiles.

The foregoing embodiments are applied to the case of correcting a wavelength displacement. The present invention is not limited thereto, and may be applicable to a case of monitoring wavelength precision. In monitoring wavelength precision, if a wavelength displacement amount obtained by the calculation controller 6 exceeds a predetermined allowable limit, the inventive spectrometer capable of correcting a wavelength displacement may be further provided with an alert unit for alerting a user to abnormality regarding the wavelength displacement amount. In such an altered arrangement, if a wavelength displacement exceeding the predetermined allowable limit is monitored, an alert is issued to the user. In such an arrangement, the user feels secure in use of the product up until an alert is issued, and can take a necessary measure in case an alert be issued.

In the foregoing embodiments, a multi-purpose plastic material such as acrylonitrile butadiene styrene (ABS) resin, which is not satisfactorily stable with time and thermal change, may be usable as a material of a support structure for supporting the respective optical elements of the polychrometer 10. This arrangement is advantageous in suppressing production cost and providing light-weigh products.

As described above, a light source is turned on to pass a monochromatic ray from the light source through an incident slit. A variation in the imaging position of a primary dispersed light image of the monochromatic ray imaged through the incident slit from the initial position thereof is obtained as a first image displacement amount, and a variation in the imaging position of a secondary dispersed light image of the monochromatic ray imaged through the incident slit from the initial position thereof is obtained as a second image displacement amount. Then, an image displacement amount free of an influence due to a wavelength fluctuation of the monochromatic ray is obtained based on the first image displacement amount and the second image displacement amount.

In such an arrangement, a wavelength displacement is corrected based on the light source for outputting a monochromatic ray. This arrangement is advantageous in securing wavelength precision substantially equal to the wavelength precision at the initial wavelength calibration time because a wavelength displacement resulting from a positional displacement of the respective optical elements to the support structure with time and thermal change can be corrected.

Preferably, the image displacement amount dx free of an influence due to a wavelength fluctuation of the monochromatic ray may be obtained according to the equation: $dx = 2 \times d1 - d2$ where $d1$ represents the first image displacement amount, $d2$ represents the second image displacement amount, and $dx$ represents the image displacement amount free of an influence due to a wavelength fluctuation of the monochromatic ray.

Preferably, the slit member may include a first slit for passing light for measurement, and a second slit for correcting a wavelength displacement. A monochromatic ray from the light source is passed through the first slit and the second slit, and an image displacement amount free of an influence due to a wavelength fluctuation of the monochromatic ray is obtained based on the primary dispersed light image of the monochromatic ray imaged through the first slit, and the secondary dispersed light image of the monochromatic ray imaged through the second slit, or based on the secondary dispersed light image of the monochromatic ray imaged through the first slit, and the primary dispersed light image of the monochromatic ray imaged through the second slit.

The above arrangement is advantageous in eliminating a requirement that the primary dispersed light image and the secondary dispersed light image are required to be imaged on the imaging plane of the sensor array at the same time in selecting a wavelength in the light source for outputting a monochromatic ray. This arrangement is also advantageous in the aspect of securing light receiving sensitivity and light emission efficiency, and reducing production cost, as well as in use of a light source for outputting a monochromatic ray in a longer wavelength.

Preferably, the slit member may include a first slit for passing light for measurement, and second and third slits for correcting a wavelength displacement. A monochromatic ray from the light source is passed through the second slit and the third slit, and an image displacement amount free of an influence due to a wavelength fluctuation of the monochromatic ray is obtained based on the primary dispersed light image of the monochromatic ray imaged through the second slit, and the secondary dispersed light image of the monochromatic ray imaged through the third slit, or based on the secondary dispersed light image of the monochromatic ray imaged through the second slit, and the primary dispersed light image of the monochromatic ray imaged through the third slit.

In such an arrangement, since the incident slit for passing light for measurement, and the incident slit for correcting a wavelength displacement are individually formed, a light source for outputting a monochromatic ray in a further longer wavelength can be used.

Preferably, the incident slit for passing light for measurement, and the incident slit for correcting a wavelength displacement may be formed in a single plate. This arrangement is advantageous because a positional displacement of the two slits relative to each other can be neglected. Dispersed light images imaged through the two slits show substantially identical image displacements to each other due to a positional displacement of the respective optical elements to the support structure. Accordingly, an image displacement amount due to a relative positional displacement of the respective optical elements can be calculated with a sufficiently small measurement error based on the image displacements of the two dispersed light images which are substantially identical to each other.

Preferably, a chopper may be disposed in front of the slit member, and the light source be turned on in a state that the chopper is closed to block light for measurement from passing through the incident slit. The monochromatic ray from the light source is reflected on the chopper and passed through the incident slit. Such an arrangement makes it possible to pass a flux of rays from the light source through the incident slit by rendering the backside surface of the chopper, which is generally provided in a spectrometric calorimeter or the like device for measuring an offset signal, diffusive and reflective.

Preferably, variations in a relative ratio of outputs of a plurality of photoelectric conversion elements in a primary imaging region and a secondary imaging region on the sensor array from their respective initial positions may be stored as information for converting the variations to variations in imaging positions of the primary and secondary dispersed light images or wavelength displacement amounts which reflect the variations in imaging positions of the primary and secondary dispersed light images. This arrangement is advantageous in obtaining a wavelength displacement amount easily based on the variations in the relative ratio of the outputs of the respective photoelectric conversion elements.

Preferably, a flux of monochromatic rays each having a half bandwidth substantially identical to the half bandwidth of the monochromatic ray from the light source and having known central wavelengths different from each other with respect to each wavelength component may be passed through the incident slit. Information for converting variations in a relative ratio of the outputs of the respective photoelectric conversion elements in the primary and secondary imaging regions from their respective initial positions to variations in imaging positions of the primary and secondary dispersed light images or wavelength displacement amounts which reflect the variations in imaging positions of the primary and secondary dispersed light images are obtained based on a relative ratio of the outputs of the respective photoelectric conversion elements in the primary and secondary imaging regions.

In such an arrangement, information for converting the variations in a relative ratio of the outputs of the respective photoelectric conversion elements in the primary and secondary imaging regions from their respective initial positions to the variations in imaging positions of the primary and secondary dispersed light images, or the wavelength displacement amounts which reflect the variations in imaging positions of the primary and secondary dispersed light images are obtained and stored by preparing a plurality of external light sources for outputting monochromatic rays.

Preferably, outputs of the respective photoelectric conversion elements in the primary imaging region on the sensor array where the primary dispersed light image is imaged and in the secondary imaging region on the sensor array where the secondary dispersed light image is imaged may be obtained when the monochromatic ray from the light source is passed through the incident slit. A half bandwidth of a spectral intensity profile of the primary dispersed light image of the monochromatic ray is estimated based on a relative ratio of the outputs of the respective photoelectric conversion elements in the primary imaging region, and known spectral sensitivities of the respective photoelectric conversion elements with respect to the primary dispersed light image in the primary imaging region. A relative ratio of the outputs of the respective photoelectric conversion elements in correspondence to a displacement of the primary dispersed light image is obtained and stored based on a spectral intensity profile of the primary dispersed light image obtained by displacing the a middle position of the spectral intensity profile of the primary dispersed light image by a certain value, and the known spectral sensitivities of the respective photoelectric conversion elements with respect to the primary dispersed light image in the primary imaging region. A spectral intensity profile of the secondary dispersed light image is estimated based on the calculated spectral intensity profile of the primary dispersed light image. A relative ratio of the outputs of the respective photoelectric conversion elements in correspondence to a displacement of the secondary dispersed light image is obtained and stored based on a spectral intensity profile of the secondary dispersed light image obtained by displacing the a middle position of the estimated spectral intensity profile of the secondary dispersed light image by a certain value, and known spectral sensitivities of the respective photoelectric conversion elements with respect to the secondary dispersed light image in the secondary imaging region.

The above arrangement is advantageous in obtaining information for converting the variations in a relative ratio of the outputs of the respective photoelectric conversion elements in the primary and secondary imaging regions from their respective initial positions to the variations in imaging positions of the primary and secondary dispersed light images or the wavelength displacement amounts which reflect the variations in imaging positions of the primary and secondary dispersed light images, without using an external light source for outputting a monochromatic ray.

Preferably, unknown spectral sensitivities of the respective photoelectric conversion elements with respect to the secondary dispersed light image may be estimated based on the estimated spectral intensity profile of the secondary dispersed light image, and the relative ratio of the outputs of the respective photoelectric conversion elements in the secondary imaging region. In such an arrangement, even if the spectral sensitivities of the respective photoelectric conversion elements with respect to the secondary dispersed light image in the secondary imaging region are unknown, information can be obtained for converting the variations in a relative ratio of the outputs of the respective photoelectric conversion elements in the primary and secondary imaging regions from their respective initial positions to the variations in imaging positions of the primary and secondary dispersed light images or the wavelength displacement amounts which reflect the variations in imaging positions of the primary and secondary dispersed light images, without using an external light source for outputting a monochromatic ray.

Preferably, a mean value which has been calculated in advance may be used as the half bandwidth of the monochromatic ray. This arrangement is advantageous in obtaining information for converting the variations in a relative ratio of the outputs of the respective photoelectric conversion elements in the primary and secondary imaging regions from their respective initial positions to the variations in imaging positions of the primary and secondary dispersed light images or the wavelength displacement amounts which reflect the variations in imaging positions of the primary and secondary dispersed light images, without greatly affecting the precision in the information, and without performing estimation of the half bandwidth which may likely to give rise to a measurement error.

Preferably, a mean spectral sensitivity which has been calculated in advance may be used as the spectral sensitivities of the respective photoelectric conversion elements in the secondary imaging region. This arrangement is advantageous in obtaining information for converting the variations in a relative ratio of the outputs of the respective photoelectric conversion elements in the primary and secondary imaging regions from their respective initial positions to the variations in imaging positions of the primary and secondary dispersed light images or the wavelength displacement amounts which reflect the variations in imaging positions of the primary and secondary dispersed light images, without greatly affecting the precision in the information, and without performing estimation of the spectral intensity profile of the secondary dispersed light image which may likely to give rise to a measurement error.

Preferably, the spectrometer may be operative to issue an alert to a user if it is detected that an image displacement amount exceeds a predetermined allowable limit. In such an arrangement, the user feels secure in use of the spectrometer up until the alert is issued. In case that the alert should be issued, the user can take a necessary measure.

As this invention may be embodied in several forms without departing from the spirit of essential characteristics thereof, the present embodiment is therefore illustrative an not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A spectrometer capable of correcting a displacement of a dispersed light image, comprising:
   a light source which outputs a monochromatic ray of light;
   a slit member formed with at least one incident slit through which the monochromatic ray from the light source is passed;
   an optical system which images a dispersed light image of the monochromatic ray through the incident slit on an imaging plane;
   a sensor array including a number of photoelectric conversion elements arrayed on the imaging plane where the dispersed light image is imaged by the optical system, the number of photoelectric conversion elements receiving dispersed light according to wavelengths so as to output an electrical signal in correspondence to an intensity of the received light with respect to each wavelength component; and
   a calculator which calculates a variation in an imaging position of a primary dispersed light image of the monochromatic ray through the incident slit on the imaging plane from an initial position thereof as a first image displacement amount, and calculates a variation in an imaging position of a secondary dispersed light image of the monochromatic ray through the incident slit from an initial position thereof as a second image displacement amount, and calculates, based on the first and second image displacement amounts, a third image displacement amount which is free of an influence due to a fluctuation of a wavelength of the monochromatic ray.

2. The spectrometer according to claim 1, wherein the calculator calculates the third image displacement amount according to the following equation:

$$dx = 2 \times d1 - d2$$

wherein d1 represents the first image displacement amount, d2 represents the second image displacement amount, and dx represents the third image displacement amount.

3. The spectrometer according to claim 1, further comprising a converter which converts the third image displacement amount to a wavelength displacement amount.

4. The spectrometer according to claim 3, wherein the slit member includes a first slit adapted for passing light for measurement, and a second slit adapted for correcting a wavelength displacement.

5. The spectrometer according to claim 4, wherein the calculator calculates the third image displacement amount based on the primary dispersed light image of the monochromatic ray passed through the first slit, and the secondary dispersed light image of the monochromatic ray passed through the second slit when the monochromatic ray from the light source is passed through the first slit and the second slit.

6. The spectrometer according to claim 4, wherein the calculator calculates the third image displacement amount based on the secondary dispersed light image of the monochromatic ray passed through the first slit, and the primary dispersed light image of the monochromatic ray passed through the second slit when the monochromatic ray from the light source is passed through the first slit and the second slit.

7. The spectrometer according to claim 4, wherein the first slit and the second slit are formed in a single plate.

8. The spectrometer according to claim 4, wherein the slit member further includes a third slit adapted for correcting a wavelength displacement.

9. The spectrometer according to claim 8, wherein the calculator calculates the third image displacement amount based on the primary dispersed light image of the monochromatic ray passed through the second slit, and the secondary dispersed light image of the monochromatic ray passed through the third slit when the monochromatic ray from the light source is passed through the second slit and the third slit.

10. The spectrometer according to claim 8, wherein the calculator calculates the third image displacement amount based on the secondary dispersed light image of the monochromatic ray passed through the second slit, and the primary dispersed light image of the monochromatic ray passed through the third slit when the monochromatic ray from the light source is passed through the second slit and the third slit.

11. The spectrometer according to claim 8, wherein the first slit, the second slit, and the third slit are formed in a single plate.

12. The spectrometer according to claim 1, further comprising a chopper disposed in front of the slit member for blocking the light for measurement from coming into the incident slit, wherein the incident silt is adapted for passing the monochromatic ray from the light source after the monochromatic ray is reflected on the chopper.

13. The spectrometer according to claim 1, wherein the calculator calculates and stores a variation in a relative ratio of outputs of the respective photoelectric conversion elements in a primary imaging region on the sensor array where the primary dispersed light image is imaged and in a secondary imaging region on the sensor array where the secondary dispersed light image is imaged.

14. The spectrometer according to claim 13, wherein the calculator calculates and stores a variation in a relative ratio of the outputs of the respective photoelectric conversion elements in the primary imaging region and in the secondary imaging region when a plurality of monochromatic rays each having a half bandwidth substantially identical to a half bandwidth of the monochromatic ray from the light source and having known central wavelengths different from each other with respect to each wavelength component are passed through the incident slit.

15. The spectrometer according to claim 1, wherein the calculator:
   calculates outputs of the respective photoelectric conversion elements in a primary imaging region on the sensor array where the primary dispersed light image is imaged and in a secondary imaging region on the sensor array where the secondary dispersed light image is imaged when the monochromatic ray from the light source is passed through the incident slit;
   estimates a half bandwidth of a spectral intensity profile of the primary dispersed light image of the monochromatic ray based on a relative ratio of the outputs of the respective photoelectric conversion elements in the primary imaging region, and known spectral sensitivities of the respective photoelectric conversion elements with respect to the primary dispersed light image in the primary imaging region;
   calculates and stores a relative ratio of the outputs of the respective photoelectric conversion elements in correspondence to a displacement of the primary dispersed light image based on a spectral intensity profile of the primary dispersed light image obtained by displacing a middle position of the spectral intensity profile of the primary dispersed light image by a certain value, and the known spectral sensitivities of the respective photoelectric conversion elements with respect to the primary dispersed light image in the primary imaging region;

estimates a spectral intensity profile of the secondary dispersed light image based on the calculated spectral intensity profile of the primary dispersed light image; and calculates and stores a relative ratio of the outputs of the respective photoelectric conversion elements in correspondence to a displacement of the secondary dispersed light image based on a spectral intensity profile of the secondary dispersed light image obtained by displacing a middle position of the estimated spectral intensity profile of the secondary dispersed light image by a certain value, and known spectral sensitivities of the respective photoelectric conversion elements with respect to the secondary dispersed light image in the secondary imaging region.

16. The spectrometer according to claim 15, wherein the calculator further estimates unknown spectral sensitivities of the respective photoelectric conversion elements with respect to the secondary dispersed light image based on the estimated spectral intensity profile of the secondary dispersed light image, and the relative ratio of the outputs of the respective photoelectric conversion elements in the secondary imaging region.

17. The spectrometer according to claim 15, wherein the calculator uses a mean value which has been calculated in advance, as the half bandwidth of the monochromatic ray.

18. The spectrometer according to claim 15, wherein the calculator uses a mean spectral sensitivity which has been calculated in advance, as the known spectral sensitivities of the respective photoelectric conversion elements with respect to the secondary dispersed light image in the secondary imaging region.

19. The spectrometer according to claim 1, wherein the spectrometer is operative to issue an alert when the third image displacement amount exceeds a predetermined allowable limit.

20. A method for correcting a displacement of a dispersed light image with use of a spectrometer, comprising the steps of:

outputting a monochromatic ray from a light source;

allowing the monochromatic ray from the light source to pass through at least one incident slit;

imaging a dispersed light image of the monochromatic ray through the incident slit on an imaging plane;

allowing a sensor array including a number of photoelectric conversion elements to receive the dispersed light image according to wavelengths, the photoelectric conversion elements being arrayed on the imaging plane of the sensor array to output an electric signal in correspondence to an intensity of the received light with respect to each wavelength component;

calculating a variation in an imaging position of a primary dispersed light image of the monochromatic ray through the incident slit on the sensor array from an initial position thereof as a first image displacement amount when the monochromatic ray from the light source is passed through the incident slit;

calculating a variation in an imaging position of a secondary dispersed light image of the monochromatic ray through the incident slit on the sensor array from an initial position thereof as a second image displacement amount when the monochromatic ray from the light source is passed through the incident slit; and calculating a third image displacement amount which is free of an influence due to a wavelength fluctuation of the monochromatic ray based on the first image displacement amount and the second image displacement amount.

\* \* \* \* \*